United States Patent
Wagner et al.

(10) Patent No.: US 10,371,591 B2
(45) Date of Patent: Aug. 6, 2019

(54) METHOD AND APPARATUS FOR CORRECTION OF PRESSURE SENSORS

(71) Applicant: Measurement Specialties, Inc., Hampton, VA (US)

(72) Inventors: David E. Wagner, Los Gatos, CA (US); Natasha V. Kachenko, Palo Alto, CA (US); James H. Hoffman, Santa Clara, CA (US)

(73) Assignee: Measurement Specialties, Inc., Hampton, VA (US)

( * ) Notice: Subject to any disclaimer, the term of this patent is extended or adjusted under 35 U.S.C. 154(b) by 230 days.

(21) Appl. No.: 15/349,479

(22) Filed: Nov. 11, 2016

(65) Prior Publication Data

US 2018/0136066 A1    May 17, 2018

(51) Int. Cl.
*G01L 19/04*    (2006.01)
*G01L 13/02*    (2006.01)

(52) U.S. Cl.
CPC ............ *G01L 13/026* (2013.01); *G01L 19/04* (2013.01)

(58) Field of Classification Search
None
See application file for complete search history.

(56) References Cited

U.S. PATENT DOCUMENTS

| | | | | |
|---|---|---|---|---|
| 4,790,192 A | * | 12/1988 | Knecht | G01L 9/0054 338/4 |
| 5,029,479 A | * | 7/1991 | Bryan | G01L 19/0038 338/4 |
| 6,023,978 A | | 2/2000 | Dauenhauer et al. | |
| 8,024,976 B2 | * | 9/2011 | Kurtz | G01L 19/0038 73/713 |
| 8,485,041 B2 | * | 7/2013 | Ahles | G01L 13/025 257/415 |
| 8,770,034 B2 | * | 7/2014 | Bentley | G01L 9/0054 73/715 |

* cited by examiner

*Primary Examiner* — Peter J Macchiarolo
*Assistant Examiner* — Jermaine L Jenkins
(74) *Attorney, Agent, or Firm* — Howard IP Law Group PC

(57) ABSTRACT

A differential pressure sensor includes one or more semiconductor dies which are thinned at portions of the die to create a chamber defining a sensitive diaphragm, having piezoresistive elements defined at a surface of the diaphragm. A first diaphragm is in fluid communication with a first fluid on an upper surface of the first diaphragm and is in fluid communication with a second fluid on a lower surface of the first diaphragm. A second diaphragm is in fluid communication with ambient pressure at an upper and a lower surface of the second diaphragm. The piezoresistive elements corresponding to the second diaphragm are electrically connected to the piezoresistive elements of the first diaphragm so as to compensate the output of the second diaphragm with respect to the output of the first diaphragm.

20 Claims, 14 Drawing Sheets

METHOD AND APPARATUS FOR CORRECTION OF PRESSURE SENSORS

FIELD OF THE INVENTION

This application relates to sensors. More particularly, the application relates to semiconductor pressure sensors having a pressure sensitive diaphragm structure.

BACKGROUND OF THE INVENTION

Differential pressure sensors measure a difference in pressure between two points of measurement (e.g. P1 and P2) of a fluid. A differential pressure sensor (or transducer) converts the pressure difference to an electrical signal that can be measured to determine the differential pressure. For example, a differential pressure sensor may be used in an oil pipe to measure the pressure before and after an orifice in the fuel pipe, from which the flow rate of the oil can be determined. Such devices are typically manufactured using micro-machined or Micro-Electro-Mechanical System (MEMS) based techniques. One common technique for manufacturing a pressure sensor is to attach a MEMS device onto a substrate, such as a ceramic or printed circuit board (PCB) substrate, along with etching and bonding techniques to fabricate very small, inexpensive devices.

The pressure-sensing die may typically be formed from a semiconductor material such as silicon. FIG. 1 is a sectional view of a MEMS type pressure sensing device or die 100 of the prior art. Pressure sensing device 100 may be formed from a silicon wafer by methods such as dicing to produce a silicon substrate structure 101. Structure 101 is thinned to create a chamber 105 and a thinned portion defining a diaphragm 103. Semiconductor substrate 101 may be thinned by any suitable means. For example, substrate 101 may be thinned using anisotropic etching as known in the art. Resistive elements 107 are formed on the surface of the diaphragm 103. Resistive elements 107 exhibit resistance that is proportional to the strain placed on the thinned semiconductor material forming diaphragm 103.

FIG. 2 is an illustration of a conventional MEMS differential pressure sensor 200 using pressure sensing device 100. Pressure sensing device 100 may be mounted to a support structure 201 which is, in turn bonded to a base plate 203, which may be formed from a non-corroding material, for example, stainless steel. Sensing device 100 and support structure 201 may be bonded to base plate 203, which may also be termed a header, by an adhesive (not shown). Support structure 201 is used to isolate pressure sensing device 100 from sources of strain that are unrelated to pressure, such as thermal expansion, which varies between pressure sensing device 100 and base plate 203. An opening 221 is defined in base plate 203 defining an aperture, which is in gas or fluid communication with the underside of the diaphragm of pressure sensing device 100. While there is some difference between the thermal expansion coefficient of pressure sensing device 100 and the thermal expansion coefficient of support structure 201, support structure 201 may be formed from glass or similar material which has a coefficient of thermal expansion closer to that of silicon pressure sensing device 100 as compared to the coefficient of thermal expansion of the stainless steel making up base plate 203. This reduces, but does not eliminate non-pressure related errors measured by pressure sensing device 100 due for example, to stress exerted on pressure sensing device 100 due to the differences in thermal expansion between pressure sensing device 100 and support structure 201. If pressure sensing device 100 is bonded directly to base plate 203, these non-pressure related errors may be even greater.

Pressure sensor 200 includes an upper housing 220. Upper housing 220 is configured to provide a sealed attachment to base plate 203. An enclosed volume 217 is defined between upper housing 220 and base plate 203. A flexible corrugated diaphragm 215 serves to divide enclosed volume 217 into a first volume 217 and a second volume 213. A port 219 is defined through a wall of upper housing 220 and is in communication with a second section or portion of gas or fluid whose pressure P2 is to be measured, and which comes in contact with another side of the pressure sensing device 100 adjacent first volume 217. Pressure sensing device 100 further includes electrical components which create and transmit an electrical signal indicative of a pressure exerted on device 100. In applications where the fluid being tested is a harsh medium, such as fuel or oil, harsh media may corrode the electrical components of device 100. In such embodiments, isolation of device 100 from the fluid being tested is accomplished by flexible corrugated diaphragm 215. An oil fill port 209 is provided through base plate 203. Oil fill port 209 allows volume 213 between device 100 and flexible diaphragm 215 to be filled with a non-corrosive fluid such as silicone oil. When the cavity defining volume 213 is filled, oil fill port 209 is sealed, for example, by welding a ball 211 across the opening of oil fill port 209. The oil in volume 213 is thus fully enclosed and in fluid communication with the upper surface of device 100.

Port 219 may be threaded to allow pressure sensor 200 to be attached via a fitting to a line or other transmission means in communication with the gas or fluid to be tested or measured. The gas or fluid being measured enters port 219 and fills interior volume 217. When interior volume 217 is filled, the fluid being measured is in contact with the upper side of flexible diaphragm 215. Pressure exerted by the gas or fluid being measured is transmitted through flexible diaphragm 215 to enclosed volume 213 of oil. The force applied to the oil by flexible diaphragm 215 is transmitted throughout the oil and to the surfaces containing the oil, including the upper surface of pressure sensing device 100.

When pressures P1 and P2 are exerted on pressure sensing device 100, an electrical signal through piezoresistive elements (107 shown in FIG. 1), formed in the upper surface of the diaphragm of pressure sensing device 100, varies responsive to variations in the piezoresistive elements. The electrical signal is representative of the differential force applied to the surface of pressure sensing device 100. The electrical signal is conducted via bond wires 202 to conductive pins 205 which may be electrically connected to other system circuitry via an electrical conductor, such as a control circuit, or converted to pressure data which may be stored, by way of non-limiting example, in an electronic memory.

Flexible diaphragm 215 and oil filled volume 213 isolate pressure sensing device 100, bond wires 202 and conductive pins 205 from the corrosive or harsh media being measured via port 219. Additionally, volume 213 containing the oil must be sealed such that leakage or contamination of the oil within volume 213 does not occur. Conductive pins 205 carrying the electrical signal from pressure sensing device 100 must pass through base plate 203 to allow external connection of other system components. Conductive pins 205 are enclosed in a glass or ceramic material fired into a tube or opening 207 which forms a hermetic seal with base plate 203. Hermetic seals are expensive to produce and are fragile, but are necessary to ensure the integrity of volume 213.

Pressure sensors, such as the sensor of FIG. 2, are intended to respond only to pressure changes of the fluid being tested. However, due at least in part to design and manufacturing constraints, additional stimuli are introduced which cause changes in the pressure sensor output which are not related to pressure. For example, stimuli such as stress, temperature, leakage current within the device, vibrations, and the like may cause the output of the sensor to change without relation to pressure. These non-pressure related changes introduce errors to the pressure reading of the sensor. Sensing systems which reduce the effects of non-pressure related stimuli experienced by a pressure sensor are desired.

SUMMARY

A pressure sensor includes a first semiconductor pressure sensing die having a sensitive diaphragm and a second semiconductor pressure sensing die having a sensitive diaphragm. A pressure sensing housing contains the first pressure sensing die and the second pressure sensing die. The housing is configured to place a first fluid at a first pressure in fluid communication with a first surface of the sensitive diaphragm of the first pressure sensing die and a second fluid at a second pressure in fluid communication with a second surface of the sensitive diaphragm of the first pressure sensing die, and to place a first and second surface of the sensitive diaphragm of the second pressure sensing die in fluid communication with a third fluid at a third pressure, such as an ambient pressure.

Piezoresistive elements are formed at a surface of the first sensitive diaphragm and the second sensitive diaphragm. The piezoresistive elements exhibit a varying resistance responsive to deflection of the corresponding sensitive diaphragm. Piezoresistive elements formed at the surface of the first sensitive diaphragm produce an electrical signal representative of a differential pressure between the first pressure and the second pressure. The piezoresistive elements formed at the surface of the second sensitive diaphragm produce an electrical signal representative of non-pressure related errors of the sensor. The output of the second sensitive diaphragm is electrically connected to the output of the first sensitive diaphragm in a manner so as to subtract the non-pressure related errors measured by the second sensitive diaphragm from the differential pressure signal measured by the first sensitive diaphragm to produce a corrected output signal of the sensor.

DETAILED DESCRIPTION

Figure 1:
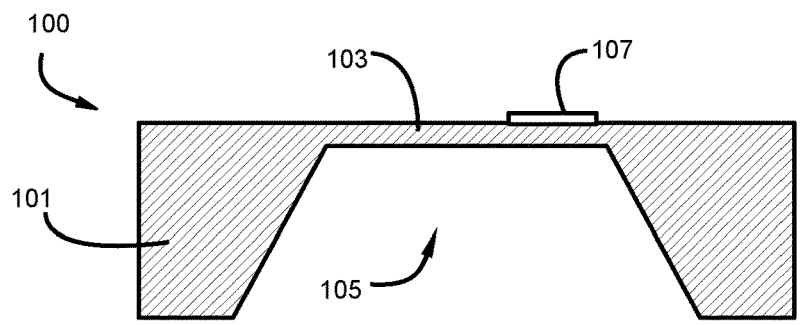
FIG. 1 is a cross-sectional view of a conventional semiconductor pressure sensing die.
Figure 2:
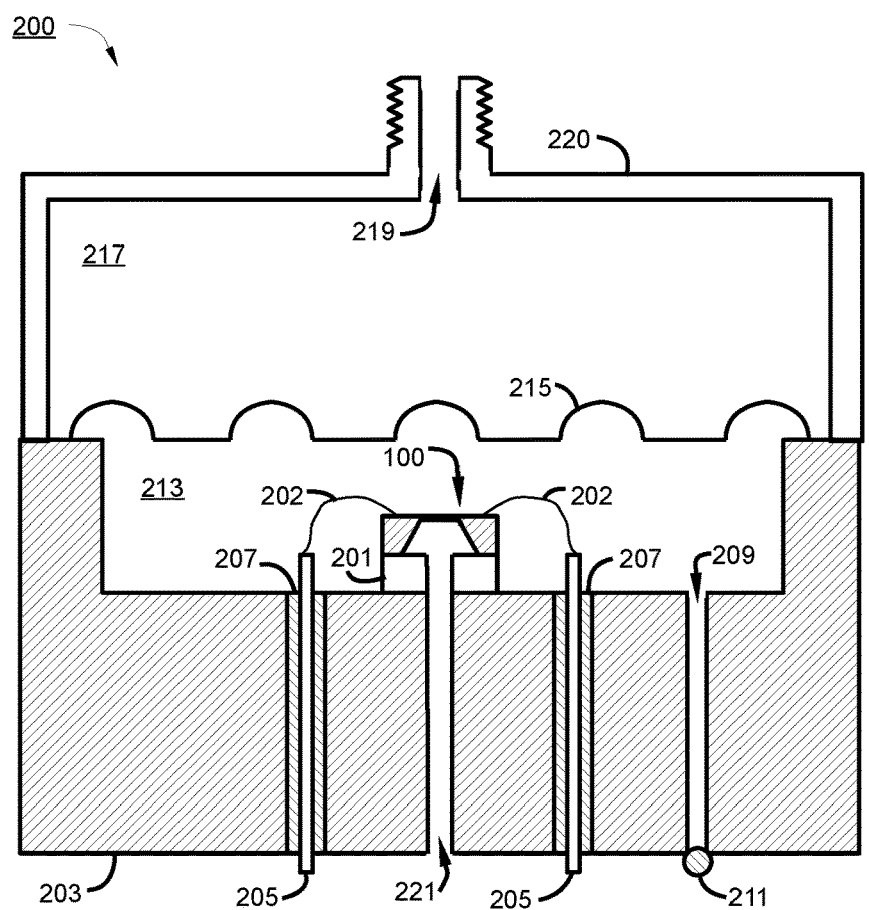
FIG. 2 is a cross-sectional view of a conventional pressure sensor using the semiconductor pressure sensing die of FIG. 1.

It is to be understood that the figures and descriptions of the present invention have been simplified to illustrate elements that are relevant for a clear understanding of the present invention, while eliminating, for purposes of clarity, many other elements found in typical sensing systems, such as MEMS-based sensors. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Figure 3:
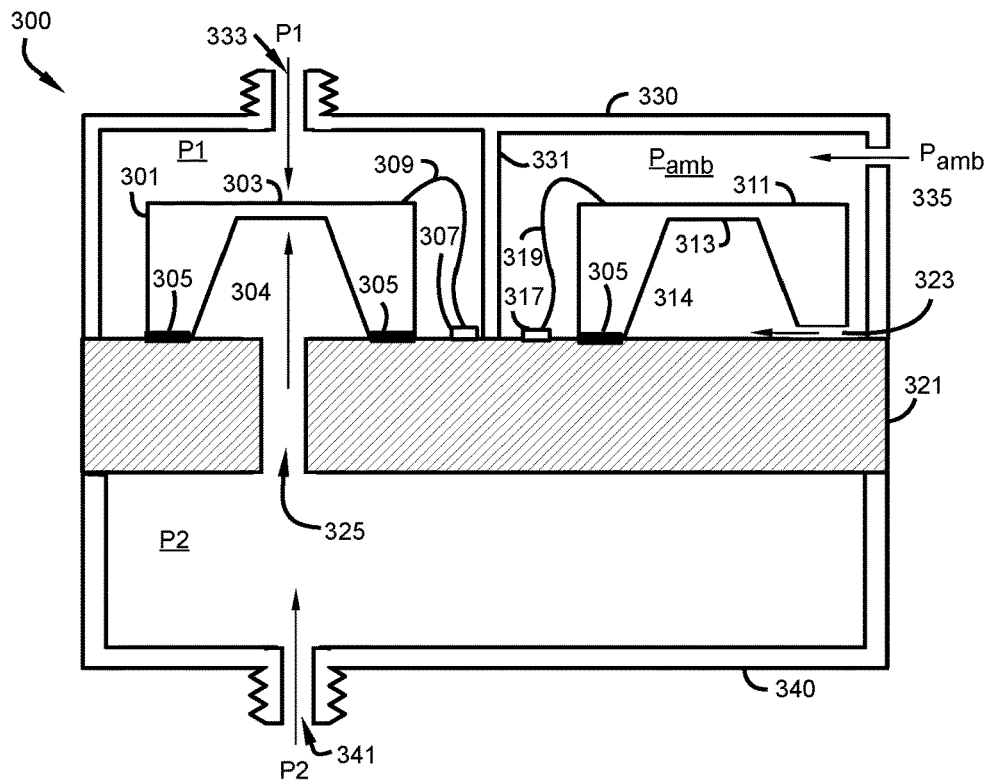
FIG. 3 is a cross-sectional view of a pressure sensor utilizing two pressure sensing dies to reduce the effects of non-pressure stimuli according to an embodiment of the disclosure.

FIG. 3 is a cross-sectional view of a differential pressure sensor 300 according to an embodiment of this disclosure. Pressure sensor 300 includes a first semiconductor pressure sensing device or die 301, thinned to define a first chamber 304 and a corresponding sensitive diaphragm 303. Sensitive diaphragm 303 flexes or deflects when pressure is exerted on a surface of sensitive diaphragm 303. The deflection of sensitive diaphragm 303 causes a change in resistance of piezoresistive elements (not shown) defined in the surface of sensitive diaphragm 303. Pressure sensor 300 further includes a second semiconductor pressure sensing device or die 311 defining a second chamber 314 and a corresponding sensitive diaphragm 313. Pressure sensing die 301 and pressure sensing die 311 are supported on a base 321. Pressure sensing dies 301, 311 are bonded to base 321 by an adhesive 305, such adhesives being known in the art. A portion of pressure sensing die 311 is not bonded to base 321 to define a ventilation channel 323.

Pressure sensing die 301 is electrically connected to a bond pad 307 by a bond wire 309. When the piezoresistive elements of sensitive diaphragm 303 are exposed to forces due to the deflection of sensitive diaphragm 303 due to pressure, the resistance of the piezoresistive elements varies with the amount of deflection of sensitive diaphragm 303. The change in resistance produces an electrical signal representative of the pressure sensed by sensitive diaphragm 303. Pressure sensing die 311 is electrically connected to a bond pad 317 by a bond wire 319. When the piezoresistive elements of sensitive diaphragm 313 are exposed to forces due to the deflection of sensitive diaphragm 313, the resistance of the piezoresistive elements varies with the amount of deflection of sensitive diaphragm 313. The change in resistance produces an electrical signal representative of the pressure sensed by sensitive diaphragm 313.

Pressure sensor 300 further includes a housing comprising an upper housing member 330 and a lower housing member 340. Upper housing member 330 covers pressure sensing die 301 and pressure sensing die 311 and includes a septum 331 which defines two isolated volumes. The first isolated volume contains pressure sensing die 301 and provides fluid communication with an upper surface of sensitive diaphragm 303. An input port 333 is defined through the wall of upper housing member 330 and provides access to the first isolated volume associated with pressure sensing die 301. A first pressure P1, produced by a fluid introduced to input port 333 is applied against the upper surface of pressure sensitive diaphragm 303. Input port 333 may include a threaded interface for attachment of the first fluid source via an appropriate fitting to input port 333.

The second isolated volume contains pressure sensitive die 311. An aperture or opening 335 is defined through a wall of upper housing member 330 and allows a pressure, by way of example only, ambient pressure $P_{amb}$ (e.g. the environmental pressure of the location of pressure sensor 300), to enter the second isolated volume. Ambient pressure enters the second isolate volume and applies the ambient pressure to the upper surface of sensitive diaphragm 313. Ambient pressure further extends through ventilation channel 323 and is applied against the lower surface of sensitive diaphragm 313. As the ambient pressure is equally applied to the upper surface and lower surface of sensitive diaphragm 313. Therefore, sensitive diaphragm does not sense any changes due to pressure. Accordingly, any signal generated from pressure sensing die 311 represents non-pressure stimuli which constitute errors, which if uncorrected, create errors in the sensor output.

Lower housing member 340 defines a volume which is in fluid communication with the lower surface of sensitive diaphragm 303 via an aperture or pathway 325 defined in base 321. An input port 341 is defined through the wall of lower housing member 340 and provides access to the lower surface of sensitive diaphragm 303 via aperture 325. A second pressure P2, produced by a fluid introduced to input port 341 is applied against the lower surface of pressure sensitive diaphragm 303. Input port 341 may include a threaded interface for attachment of the second fluid source via an appropriate fitting to input port 341.

In operation, pressure P1 enters input port 333 and exerts a force on the upper surface of sensitive diaphragm 303. Pressure P2 enters input port 341 and exerts a force on the lower surface of sensitive diaphragm 303. Sensitive diaphragm 303 undergoes deformation as a result of the differential pressure between P1 and P2. The deformation produces a change in resistance of piezoresistors on the surface of sensitive diaphragm 303 and produces a signal representative of the differential pressure. The output signal of pressure sensing die 301 further includes non-pressure related errors caused by non-pressure stimuli acting thereon.

Because pressure sensing die 301 and pressure sensing die 311 are in close proximity (e.g. mounted in a common sensor, which may be mounted to, by way of example, a chassis of a vehicle), pressure sensing die 301 and pressure sensing die 311 are likely to experience similar non-pressure related errors. However, only pressure sensing die 301 is exposed to changes in pressure. Pressure sensing die 311, on the other hand, is configured such that pressure (e.g. ambient pressure) is applied equally to the upper and lower surface of sensitive diaphragm 313. Therefore, the non-pressure related errors experienced by both pressure sensing die 301 and pressure sensing die 311 are measured in isolation and output by pressure sensing die 311. The piezoresistive elements of sensitive diaphragm 303 and sensitive diaphragm 313 may electrically connected such that the non-pressure related errors measured by pressure sensing die 311 are subtracted or otherwise removed from the output signal of pressure sensing die 301 for generating a corrected differential pressure signal, which may be output from pressure sensor 300.

Figure 4:
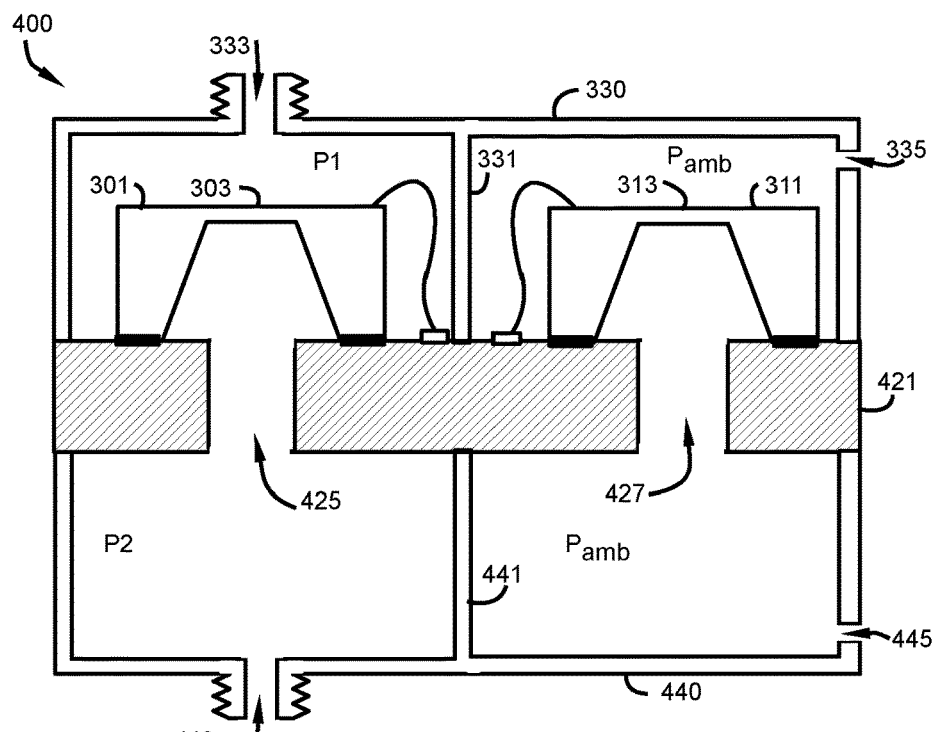
FIG. 4 is a cross-sectional view of a pressure sensor utilizing two pressure sensing dies to reduce the effects of non-pressure stimuli according to an embodiment of the disclosure.

FIG. 4 is a cross-sectional view of a pressure sensor 400 according to another embodiment of the disclosure. Pressure sensor 400 functions similarly to pressure sensor 300 of FIG. 3. However, pressure sensor 400 includes lower housing member 440 which includes a septum 441 defining two isolated volumes. The first isolated volume is in fluid communication with an input port 443 and the lower surface of sensitive diaphragm 303 via an aperture 425 defined in a base 421. Aperture 425 may be configured to have a diameter that is substantially equal to or greater than the diameter of sensitive diaphragm 303. The second isolated volume is in fluid communication with a pressure source, for example, ambient pressure $P_{amb}$ via an opening 445 defined through the wall of lower housing member 440 and with the lower surface of sensitive diaphragm 313 via an aperture 427 defined in base 421. Aperture 427 may be configured to have a diameter that is substantially equal to or greater than the diameter of sensitive diaphragm 313.

As with pressure sensing die 311 of FIG. 3, pressure is applied to the upper surface of sensitive diaphragm 313 via opening 335 in upper housing member 330. Pressure is equally applied to the lower surface of sensitive diaphragm 313 via opening 445 in lower housing member 440. Thus, pressure sensing die 311 does not sense pressure related changes. Rather, any output from pressure sensing die 311 represents non-pressure related stimuli defining non-pressure related errors.

In operation, the upper surface of sensitive diaphragm 303 is exposed to pressure P1 via input port 333. Lower surface of sensitive diaphragm 303 is exposed to pressure P2 via input port 443. Because pressure sensing die 301 and pressure sensing die 311 are in close proximity (e.g. mounted in a common sensor, which may be mounted to, by way of example, a chassis of a vehicle), pressure sensing die 301 and pressure sensing die 311 may experience similar non-pressure related errors. However, only pressure sensing die 301 is exposed to changes in pressure. Pressure sensing die 311, on the other hand, is configured such that ambient pressure is applied equally to the upper and lower surface of sensitive diaphragm 313. Therefore, the non-pressure related errors experienced by both pressure sensing die 301 and pressure sensing die 311 are measured in isolation and output by pressure sensing die 311. Accordingly, the piezoresistive elements of sensitive diaphragm 303 and sensitive diaphragm 313 may electrically connected such that the non-pressure related errors measured by pressure sensing die 311 are subtracted or otherwise canceled from the output signal of pressure sensing die 301, for generating a corrected differential pressure signal which may be output from pressure sensor 400.

Figure 5:
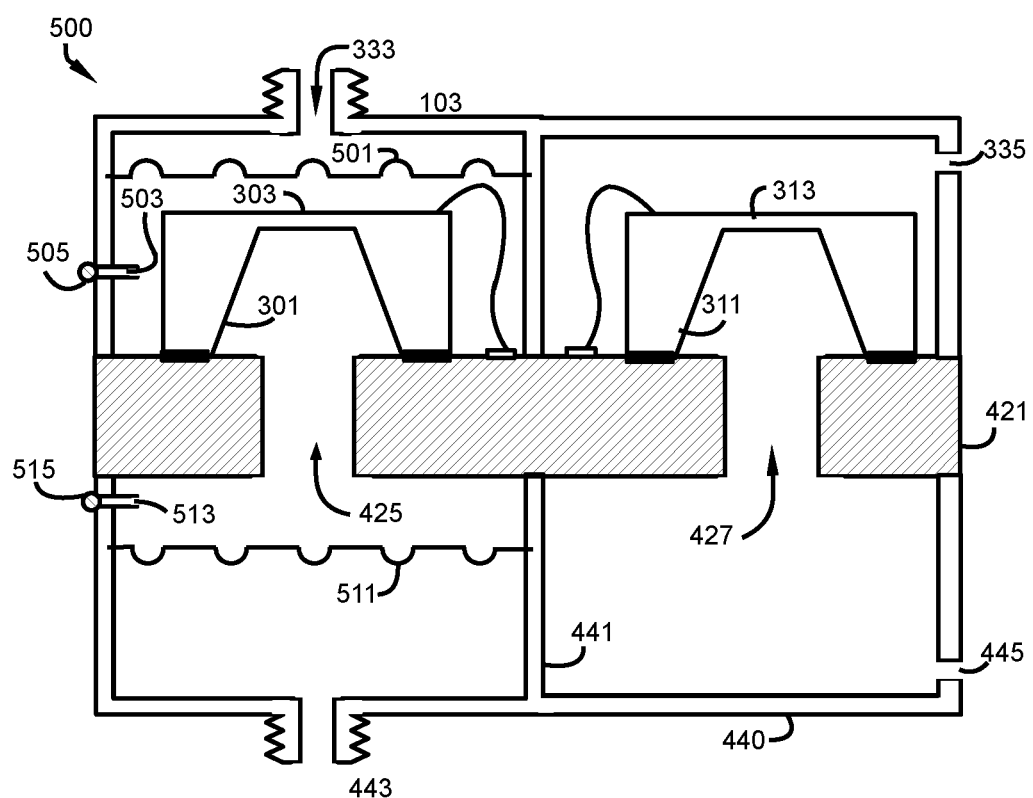
FIG. 5 is a cross-sectional view of a pressure sensor utilizing two pressure sensor dies to reduce effects of non-pressure stimuli, which may be used in an environment where harsh media are being measured according to an embodiment of the disclosure.

FIG. 5 is a cross-sectional view of a pressure sensor 500 configured for measuring differential pressures of harsh media according to an embodiment of the disclosure. Pressure sensor 500 is similar in operation to pressure sensor 400 of FIG. 4. Pressure sensing die 311 detects common non-pressure related by receiving ambient pressure via openings 335, 445 equally to the upper and lower surface of sensitive diaphragm 313 as discussed above. In pressure sensor 500, the first isolated volume defined in upper housing member 330 associated with pressure sensing die 301 is further subdivided into two further isolated volumes. The two isolated subdivided volumes are defined by a flexible diaphragm 501. Flexible diaphragm 501 may comprise a material that is resistant to the effects of a harsh medium such as acid or corrosive liquids or gases. For example, flexible diaphragm 501 may comprise stainless steel. A first subdivided volume is in fluid communication with input port 333 and receives the first fluid under test at pressure P1. The first fluid under test may be harsh medium, such as a corrosive liquid or gas which if allowed to contact the semiconductor surface of sensitive diaphragm 303 may cause damage to sensor 500.

The second isolated subdivided volume is in fluid communication with the upper surface of sensitive diaphragm 303. The second isolated subdivided volume may be filled with a fluid that is compatible with the material of sensitive diaphragm 303, for example, silicone oil may be used of fill the second isolated sub-divided volume. The second isolated subdivided volume may be filled using a fill port 503. When the second isolated subdivided volume is filled, fill port 503 may be sealed, for example, by welding a ball 505 over the opening defined by fill port 503. In operation, a first fluid or gas under test will be introduced to the first isolated subdivided volume via input port 333. The first fluid or gas under test will have a pressure which exerts a force against flexible diaphragm 501. Flexible diaphragm 501 will flex under the applied force and transmit the force to the fluid in the second isolated subdivided volume including the upper surface of sensitive diaphragm 303.

Similarly, the first isolated volume defined in lower housing member 440 associated with pressure sensing die 301 is further subdivided into two further isolated volumes. The two isolated subdivided volumes are defined by a flexible diaphragm 511. Flexible diaphragm 511 may comprise a material that is resistant to the effects of a harsh medium such as acid or corrosive liquids or gases. For example, flexible diaphragm 511 may comprise stainless steel. A first subdivided volume is in fluid communication with input port 443 and receives the second fluid under test at pressure P2. The second fluid under test may be harsh medium, such as a corrosive liquid or gas which if allowed to contact the semiconductor surface of sensitive diaphragm 303 may cause damage to sensor 500.

The second isolated subdivided volume is in fluid communication with the lower surface of sensitive diaphragm 303. The second isolated subdivided volume may be filled with a fluid that is compatible with the material of sensitive diaphragm 303, for example, silicone oil may be used to fill the second isolated subdivided volume. The second isolated subdivided volume may be filled using a fill port 513. When the second isolated subdivided volume is filled, fill port 513 may be sealed, for example, by welding a ball 515 over the opening defined by fill port 513. In operation, a second fluid or gas under test will be introduced to the first isolated subdivided volume via input port 443. The first fluid or gas under test will have a pressure which exerts a force against flexible diaphragm 511. Flexible diaphragm 511 will flex under the applied force and transmit the force to the fluid in the second isolated subdivided volume including the lower surface of sensitive diaphragm 303 via aperture 425 defined in base 421.

In operation, pressure sensing die 301 measures differential pressure between P1 and P2. Pressure sensing die 301 is electrically connected to pressure sensing die 311, which as described above with respect to FIG. 4, senses only non-pressure related errors. The non-pressure related errors may be subtracted from an output signal of pressure sensing die 301 to produce a corrected adjusted output of sensor 500.

Figure 6A:
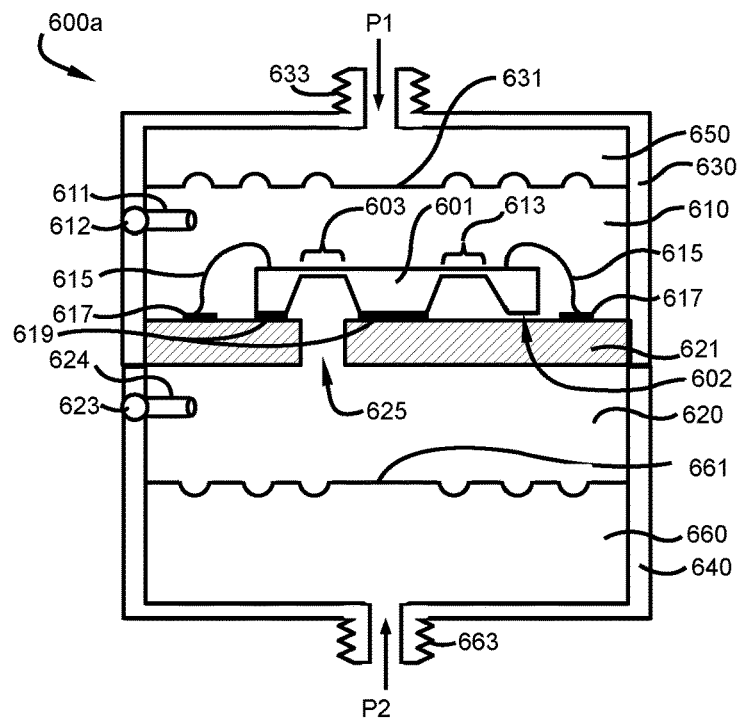
FIG. 6A is a cross-sectional view of a pressure sensor utilizing multiple pressure sensitive diaphragms on a single pressure sensing die to reduce effects of non-pressure stimuli according to an embodiment of the disclosure.

Referring to FIG. 6A, a cross-sectional view of a pressure sensor 600*a* according to an embodiment of the disclosure is shown. Pressure sensor 600*a* includes a single pressure sensing die 601. Pressure sensor die 601 is thinned in two locations to form a first sensitive diaphragm 603 and a second sensitive diaphragm 613. A plurality of piezoresistive elements (not shown) are formed or arranged at the surface of sensitive diaphragm 603 and at the surface of sensitive diaphragm 613. Pressure applied to respective surface of the sensitive diaphragms 603, 613 cause deflection thereof, which exerts stress on the piezoresistive elements. The electrical resistance of the piezoresistive elements varies due to the stress created as the sensitive diaphragm is deflected by the applied pressure. The piezoresistive elements are electrically connected to contact pads 617 via bond wires 615. The pressure sensing die 601 is bonded to a base plate 621 by adhesive bonds 619. Adhesive bonds 619 may be formed using an adhesive or by a fixed bonding technique such as solder or glass frit. Base plate 621 is connected to a housing formed from a first housing member 630 and a second housing member 640.

First housing member 630 defines a first chamber. The first chamber is divided by a flexible diaphragm 631 to define a first pressure volume 650 and a first fluid-fillable volume 610. First fluid-fillable volume 610 may be filled with a fluid which is not harmful to pressure sensing die 601 or the piezoresistive elements or electrical connections associated with the sensitive diaphragms 603, 613 by way of a fill port 611. By way of example, in a sensor where pressure sensing die 601 comprises a semiconductor material, fluid-fillable volume 610 may be filled with an oil, such as silicone oil. Once filled, fluid-fillable volume 610 may be sealed using a welding ball 612 or other technique for sealing fill port 611 (e.g. crimping). A threaded port 633 is defined in a wall of first housing member 630 to allow a first fluid at a first pressure P1, to enter pressure sensor 600a. The first fluid enters port 633 and fills a first pressure volume 650. The first fluid is at a first pressure which exerts a force on flexible diaphragm 631. Flexible diaphragm 631 deflects due to the exerted force and transmits the force through the fluid in fluid-fillable volume 610 to a surface of sensitive diaphragm 603 and sensitive diaphragm 613. Pressure sensing die 601 includes a vent channel 602 defining a space between pressure sensing die 601 and base plate 621, which allows the pressure exerted by the fluid in fluid-fillable volume 610 to enter the space below sensitive diaphragm 613 and apply the first pressure to the second surface of sensitive diaphragm 613 opposite the first surface of sensitive diaphragm 613. Because the first pressure P1 is applied equally to the first and second surfaces of sensitive diaphragm 613, the output signal from the sensitive diaphragm 613 will be substantially only indicative of non-pressure related inputs or factors.

Second housing member 640 defines a second chamber. The second chamber is divided by a second flexible diaphragm 661 for defining a second pressure volume 660 and a second fluid-fillable volume 620. Second fluid-fillable volume 620 may be filled with a fluid which is not harmful to pressure sensing die 601 or the piezoresistive elements or electrical connections associated with the sensitive diaphragms 603, 613. Second fluid-fillable volume 620 may be filled with a non-harmful fluid via a filling tube 624. By way of example, if pressure sensing die 601 comprises a semiconductor material, second fluid-fillable volume 620 may be filled with an oil, such as silicone oil. Once filled, fluid-fillable volume 620 may be sealed, using a welding ball 623, or other technique for sealing filling tube 624 (e.g. crimping). A threaded port 663 is defined in a wall of second housing member 640 to allow a second fluid at a second pressure, P2, to enter pressure sensor 600a. The second fluid enters port 663 and fills second pressure volume 660. The second fluid is at a second pressure which exerts a force on second flexible diaphragm 661. Second flexible diaphragm 661 deflects due to the exerted force and transmits the force through the fluid in second fluid-fillable volume 620 to a lower surface of sensitive diaphragm 603 by entering hole 625 defined through base plate 621. Sensitive diaphragm 603 receives pressure P1 to a first surface of the sensitive diaphragm 603 and receives pressure P2 to the second surface of the sensitive diaphragm 603, opposite the first surface. Accordingly, the output of sensitive diaphragm 603 represents a differential pressure between pressure P1 and pressure P2 in addition to any non-pressure related signals.

The piezoresistive elements defined at or on the surface of sensitive diaphragm 603 may be electrically connected to the piezoresistive elements defined at or on the surface of sensitive diaphragm 613 in a manner such that an output signal generated by sensitive diaphragm 613 is subtracted from an output signal generated by sensitive diaphragm 601. As described above, the result of this subtraction is a corrected output signal indicative of only the sensed differential pressure.

Non-pressure related signals mitigated by embodiments of the present disclosure may include stress forces which are created when a fluid conduit fitting is threaded onto threaded port 633 or port 663. The tightness at which the fitting is attached may create stresses that are transmitted through housing members 630, 640 to base plate 621. Base plate 621 is directly attached to semiconductor pressure sensing die 601 and may create stresses affecting sensitive diaphragms 603, 613. Other properties, such at the thermal expansion coefficients of pressure sensing die 601, base plate 621 and housing members 630, 640 may differ, causing adjoining components to expand or contract at different rates with response to temperature. A change in temperature, combined with varying rates of expansion or contraction, may create additional stress that may be transferred to sensitive diaphragms 603, 613 causing a change in the resistance of piezoresistive elements on the surface of sensitive diaphragm 603, 613.

Figure 6B:
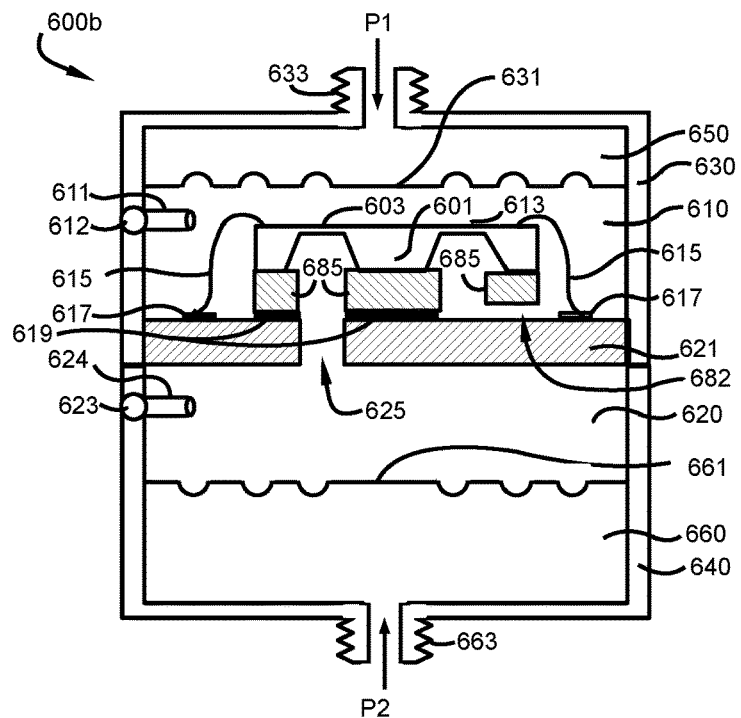
FIG. 6B is a cross-sectional view of a pressure sensor utilizing multiple pressure sensitive diaphragms on a single pressure sensing die supported by a lower constraint to reduce effects of non-pressure stimuli according to an embodiment of the disclosure.

FIG. 6B shows a pressure sensor 600b that is similar in many respects to sensor 600a of FIG. 6A. In sensor 600b, however, pressure sensing die 601 is connected to a constraint 685, which is in turn attached to base plate 621. Constraint 685 includes a vent channel 682, which defines a space between constraint 685 and base plate 621. Vent channel 682 allows a first pressure or alternatively, ambient pressure, to enter the space below sensitive diaphragm 613. The first or ambient pressure is thereby applied to the second surface of sensitive diaphragm 613 opposite the first surface of sensitive diaphragm 613. Constraint 685 may comprises a material possessing a thermal expansion coefficient that is closer to the thermal expansion coefficient of the semiconductor material of pressure sensing die 601 than the thermal expansion coefficient of base plate 621. Under conditions where temperature variations cause expansion or contraction of the materials of pressure sensing die 601, constraint 685 and/or base plate 621, reducing the difference between the thermal expansion coefficients of adjoining materials will reduce stress on pressure sensing die 601 due to thermal effects or non-pressure related stimuli.

Figure 6C:
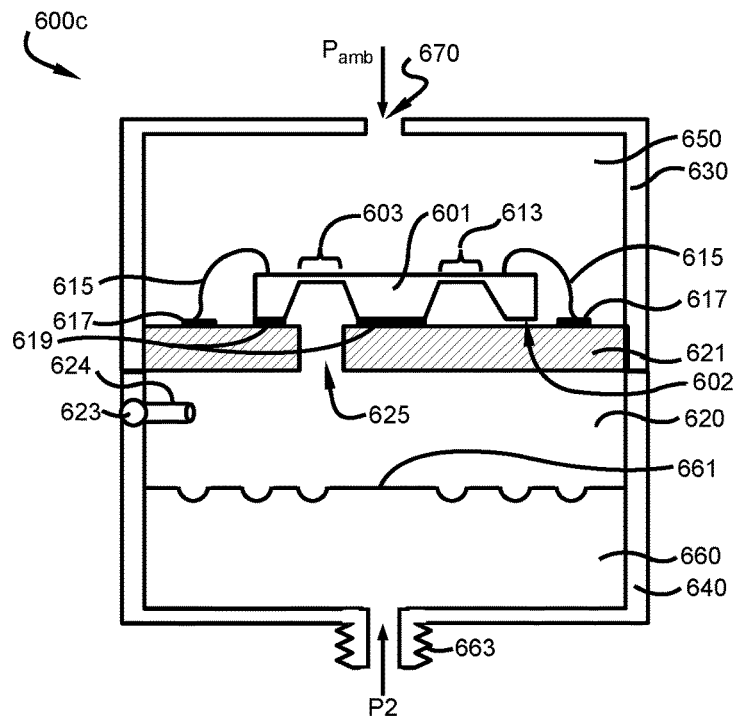
FIG. 6C is a cross-sectional view of a pressure sensor utilizing multiple pressure sensitive diaphragms on a single pressure sensing die to reduce effects of non-pressure stimuli according to an embodiment of the disclosure.

FIG. 6C is a cross-sectional view of a pressure sensor 600c according to an embodiment of the disclosure. Pressure sensor 600b includes a single pressure sensing die 601. Pressure sensor die 601 is thinned in two locations to form a first sensitive diaphragm 603 and a second sensitive diaphragm 613. A plurality of piezoresistive elements (not shown) are formed or arranged at the surface of sensitive diaphragm 603 and at the surface of sensitive diaphragm 613. Pressure applied to a surface of sensitive diaphragms 603, 613 cause deflection of the sensitive diaphragms, which exerts stress on the piezoresistive elements. The electrical resistance of the piezoresistive elements varies due to the stress created as sensitive diaphragms 603, 613 are deflected by the applied pressure. The piezoresistive elements are electrically connected to contact pads 617 via bond wires 615. The pressure sensing die 601 is bonded to a base plate 621 by adhesive bonds 619. Adhesive bonds 619 may be formed using an adhesive or by a fixed bonding technique such as solder or glass frit. Base plate 621 is connected to a housing formed from a first housing member 630 and a second housing member 640.

First housing member 630 defines a first pressure volume 650. First housing member 630 has an opening 670 which allows a pressure, such as ambient pressure $P_{amb}$ to enter the first pressure volume 650. Pressure sensing die 601 includes a vent channel 602 which defines a space between pressure sensing die 601 and base plate 621 allowing the ambient pressure to enter the space below sensitive diaphragm 613 and apply the ambient pressure to the second surface of sensitive diaphragm 613 opposite the first surface of sensitive diaphragm 613. Because the ambient pressure is applied equally to the first and second surfaces of sensitive diaphragm 613, the output signal from sensitive diaphragm 613 will be the result of non-pressure related inputs.

Second housing member 640 defines a second chamber. The second chamber is divided by a flexible diaphragm 661 for defining a second pressure volume 660 and a fluid-fillable volume 620. Fluid-fillable volume 620 may be filled with a fluid which is not harmful to pressure sensing die 601 or the piezoresistive elements or electrical connections associated with the sensitive diaphragms 603, 613 via a fill port 624. By way of example, if pressure sensing die 601 comprises a semiconductor material, second fluid-fillable volume 620 may be filled with an oil, such as silicone oil. Once filled, the fluid-fillable volume 620 may be sealed, using a welding ball 623, or other technique for sealing fill port 624 (e.g. crimping). A threaded port 663 is defined in a wall of second housing member 640 to allow a second fluid at a second pressure, P2, to enter pressure sensor 600c. The second fluid enters port 663 and fills second pressure volume 660. The second fluid is at a second pressure which exerts a force on flexible diaphragm 661. Flexible diaphragm 661 deflects due to the exerted force and transmits the force through the fluid in second fluid-fillable volume 620 to a lower surface of sensitive diaphragm 603 by entering a hole 625 defined through base plate 621. Sensitive diaphragm 603 receives ambient pressure $P_{amb}$ at a first surface of the sensitive diaphragm 603 and receives pressure P2 at the second surface of the sensitive diaphragm 603, opposite the first surface. Accordingly, the output of sensitive diaphragm 603 represents the differential pressure between ambient pressure $P_{amb}$ and pressure P2 in addition to any non-pressure related signals. The piezoresistive elements defined at the surface of sensitive diaphragm 603 may be electrically connected to the piezoresistive elements defined at the surface of sensitive diaphragm 613 in a manner such that the output signal generated by sensitive diaphragm 613 is subtracted from the output generated by sensitive diaphragm 601. As sensitive diaphragm 613 only generates an output containing non-pressure related inputs, and sensitive diaphragm 603 includes both a differential pressure measurement along with similar non-pressure related inputs to those of sensitive diaphragm 613, subtracting the non-pressure related signal of sensitive diaphragm 613 from the output signal of sensitive diaphragm 603 results in the remaining output signal of the sensor 600c containing only the signal generated by the differential pressure input, thereby providing a corrected signal.

As set forth above, non-pressure related signals may include stress forces which are created when a fluid conduit fitting is threaded onto threaded port 663. The tightness at which the fitting is attached may create stresses that are transmitted through housing members 630, 640 to base plate 621. Base plate 621 is directly attached to semiconductor pressure sensing die 601 and may create stresses to sensitive diaphragms 603, 613. Other properties, such at the thermal expansion coefficients of pressure sensing die 601, base plate 621 and housing members 630, 640 may differ, causing adjoining components to expand or contract at different rates with response to temperature. A change in temperature, combined with varying rates of expansion or contraction, may create additional stress that may be transferred to sensitive diaphragms 603, 613 causing a change in the resistance of piezoresistive elements on the surface of sensitive diaphragm 603, 613.

Figure 6D:
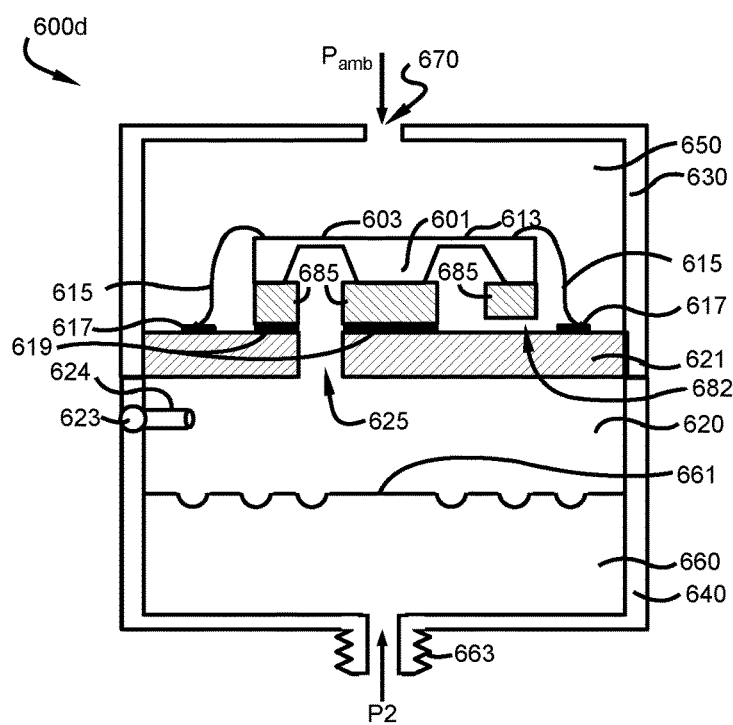
FIG. 6D is a cross-sectional view of a pressure sensor utilizing multiple pressure sensitive diaphragms on a single pressure sensing die supported by a lower constraint to reduce effects of non-pressure stimuli according to an embodiment of the disclosure.

FIG. 6D shows a pressure sensor 600d that is similar in many respects to sensor 600c of FIG. 6C. In sensor 600d, however, pressure sensing die 601 is connected to a constraint 685, which is in turn, attached to base plate 621. Constraint 685 may comprises a material possessing a thermal expansion coefficient that is closer to the thermal expansion coefficient of the semiconductor material of pressure sensing die 601, than the thermal expansion coefficient of base plate 621. Under conditions where temperature variations cause expansion or contraction of the materials of pressure sensing die 601, constraint 685 and/or base plate 621, reducing the difference between the thermal expansion coefficients between adjoining materials will reduce stress on pressure sensing die 601 due to thermal effects and non-pressure related stimuli.

Figure 6E:
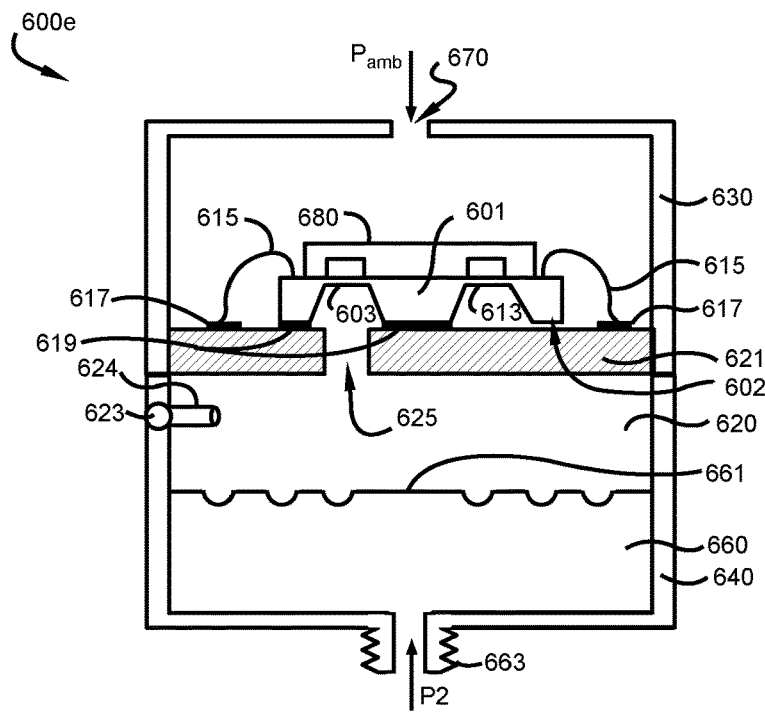
FIG. 6E is a cross-sectional view of a pressure sensor utilizing multiple pressure sensitive diaphragms on a single pressure sensing die to reduce effects of non-pressure stimuli according to an embodiment of the disclosure.

FIG. 6E is a cross-sectional view of a pressure sensor 600e according to an embodiment of the disclosure. Pressure sensor 600e includes a single pressure sensing die 601. Pressure sensor die 601 is thinned to form a first sensitive diaphragm 603 and a second sensitive diaphragm 613. A plurality of piezoresistive elements (not shown) are formed at the surface of sensitive diaphragm 603 and at the surface of sensitive diaphragm 613. Pressure applied to a surface of the sensitive diaphragms 603, 613 causes deflection of the sensitive diaphragm which exerts stress on the piezoresistive elements. The electrical resistance of the piezoresistive elements varies due to the stress created as the sensitive diaphragm 603, 613 is deflected by the applied pressure. The piezoresistive elements are electrically connected to contact pads 617 via bond wires 615. Pressure sensing die 601 is bonded to a base plate 621 by adhesive bonds 619. Adhesive bonds 619 may be formed using an adhesive or by a fixed bonding technique such as solder or glass frit. Base plate 621 is connected to a housing formed from a first housing member 630 and a second housing member 640.

A cap 680 is attached to a first surface of pressure sensing die 601. Cap 680 has spaces or voids defined within cap 680 which are positioned at locations on pressure sensing die 601 where sensitive diaphragm 603 and sensitive diaphragm 613 are located. A vacuum is formed and trapped within the cavities formed in cap 680. Diaphragm 603 is exposed to pressure P2 from below and measures this pressure with reference to the vacuum under cap 680, which is in contact with the upper surface of diaphragm 603. Diaphragm 613 is exposed to a pressure, for example ambient pressure $P_{amb}$, from below and measures pressure $P_{amb}$ with reference to the vacuum formed under cap 680, which is in contact with the upper surface of diaphragm 613. Thus, the embodiment shown in FIG. 6E measures an absolute pressure value for pressure P2 via diaphragm 603 and an absolute pressure value for ambient pressure $P_{amb}$ via diaphragm 613. By subtracting the pressure values measured by diaphragm 613 from the pressure value measured by diaphragm 603, a differential pressure between pressure P2 and ambient pressure $P_{amb}$ may be determined. The determined differential pressure may be provided as output of the pressure sensor 600e.

First housing member 630 defines a first pressure volume 650. First housing member 630 has an opening 670 which allows ambient pressure $P_{amb}$ to enter the first pressure volume 650. Pressure sensing die 601 includes a vent channel 602, which defines a space between pressure sensing die 601 and base plate 621 allowing the ambient pressure to enter the space below sensitive diaphragm 613 and apply the ambient pressure to the second surface of sensitive diaphragm 613 opposite the first surface of sensitive diaphragm 613. The differential pressure between pressure P2 and ambient pressure $P_{amb}$ may be determined, for example, by processing the outputs produced by sensitive diaphragms 603, 613, which are based on the variable resistance of piezoresistive elements on diaphragms 603, 613. For example, the output based on the variable resistance of diaphragms 603, 613 may be processed in circuitry such as the circuitry shown and referenced in FIG. 7, which is discussed in detail below.

Second housing member 640 defines a second chamber. The second chamber is divided by a flexible diaphragm 661 which defines a second pressure volume 660 and a fluid-fillable volume 620. Fluid-fillable volume 620 may be filled with a fluid which is not harmful to pressure sensing die 601 or the piezoresistive elements or electrical connections associated with sensitive diaphragms 603, 613 via fill port 624. By way of example, if pressure sensing die 601 comprises a semiconductor material, fluid-fillable volume 620 may be filled with an oil, such as silicone oil. Once filled, fluid-fillable volume 620 may be sealed, using a welding ball 623, or other technique for sealing fill port 624 (e.g. crimping). A threaded port 663 is defined in a wall of second housing member 640 to allow a second fluid at a second pressure, P2, to enter pressure sensor 600e. The second fluid enters port 663 and fills second pressure volume 660. The second fluid is at a second pressure which exerts a force on flexible diaphragm 661. Flexible diaphragm 661 deflects due to the exerted force and transmits the force through the fluid in fluid-fillable volume 620 to a lower surface of sensitive diaphragm 603 by entering hole 625 defined through base plate 621. Sensitive diaphragm 603 is in contact on its upper surface by a vacuum formed under cap 680 and receives pressure P2 to the second surface of the sensitive diaphragm 603, opposite the first surface. Accordingly, the output of sensitive diaphragm 603 represents an absolute pressure value representative of pressure P2 relative to a vacuum in addition to any non-pressure related signals. The piezoresistive elements defined at the surface of sensitive diaphragm 603 may be electrically connected to the piezoresistive elements defined at the surface of sensitive diaphragm 613 in a manner such that the output signal generated by sensitive diaphragm 613 is subtracted from the output generated by sensitive diaphragm 601. As both sensitive diaphragm 603 and sensitive diaphragm 613 generate outputs each containing non-pressure related inputs, subtracting the measured signals of sensitive diaphragm 603 from the output signal of sensitive diaphragm 613 results in a corrected output signal of the sensor 600e.

Non-pressure related signals may include stress forces which are created when a fluid conduit fitting is threaded onto threaded port 663. The tightness at which the fitting is attached may create stresses that are transmitted through housing members 630, 640 to base plate 621. Base plate 621 is directly attached to semiconductor pressure sensing die 601 and may create stresses to sensitive diaphragms 603, 613. Other properties, such as the thermal expansion coefficients of pressure sensing die 601, base plate 621 and housing members 630, 640 may differ, causing adjoining components to expand or contract at different rates with response to temperature. A change in temperature, combined with varying rates of expansion or contraction, may create additional stress that may be transferred to sensitive diaphragms 603, 613 causing a change in the resistance of piezoresistive elements on the surface of sensitive diaphragm 603, 613.

Figure 6F:
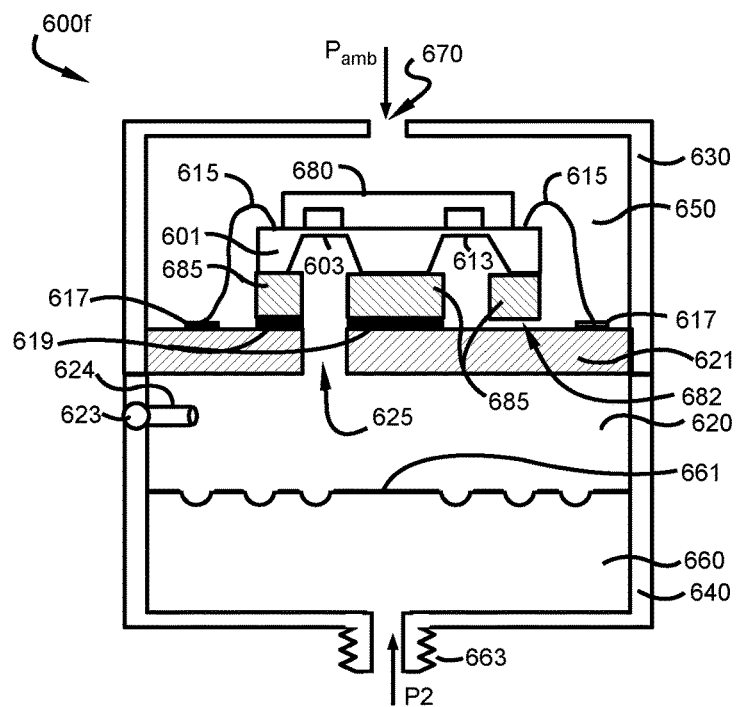
FIG. 6F is a cross-sectional view of a pressure sensor utilizing multiple pressure sensitive diaphragms on a single pressure sensing die supported by a lower constraint to reduce effects of non-pressure stimuli according to an embodiment of the disclosure.

FIG. 6F is a cross-sectional view of a pressure sensor 600f according to an embodiment of the disclosure. Pressure sensor 600f includes a single pressure sensing die 601. Pressure sensor die 601 is thinned in multiple locations to form a first sensitive diaphragm 603 and a second sensitive diaphragm 613. A plurality of piezoresistive elements (not shown) are formed at or arranged on the surface of sensitive diaphragm 603 and at the surface of sensitive diaphragm 613. A cap 680 is attached to a first surface of pressure sensing die 601. Cap 680 has spaces defined within cap 680 which are positioned at locations on pressure sensing die 601 where sensitive diaphragm 603 and sensitive diaphragm 613 are located. Pressure sensing die 601 is further attached to a constraint 685 at the surface of pressure sensing die 601 opposite sensitive diaphragms 603, 613. Constraint 685 may comprises a material possessing a thermal expansion coefficient that is closer to the thermal expansion coefficient of the semiconductor material of pressure sensing die 601 than thermal expansion coefficient of base plate 621. Under conditions where temperature variations cause expansion or contraction of the materials of pressure sensing die 601, constraint 685 and/or base plate 621, reducing the difference between the thermal expansion coefficients between adjoining materials will reduce stress on the pressure sensing die 601 due to thermal effects and non-pressure related stimuli. In addition, constraint 685 increases the strength of the pressure sensing die structure, which further isolates the dies and pressure sensitive diaphragms from adverse effects of stress.

Figure 6G:
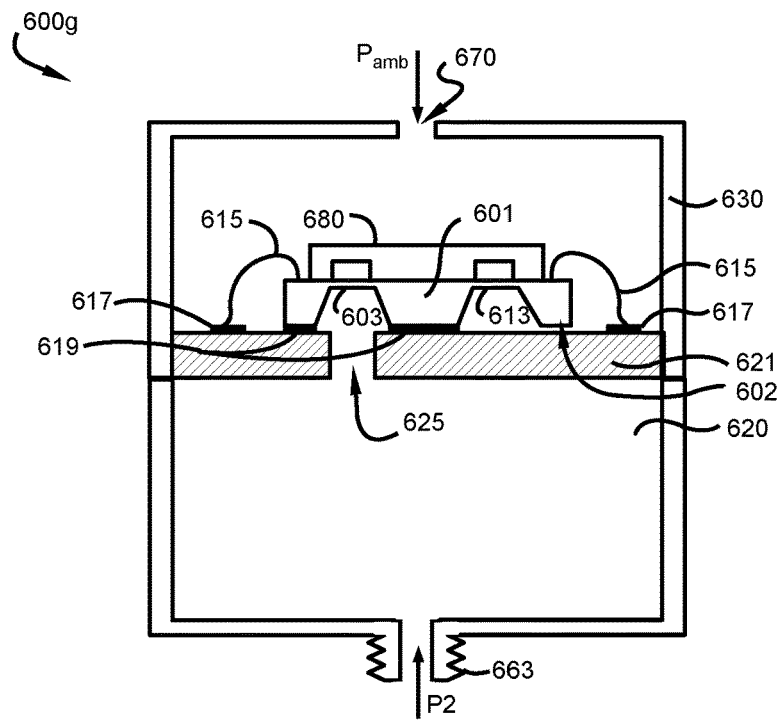
FIG. 6G is a cross-sectional view of a pressure sensor utilizing multiple pressure sensitive diaphragms on a single pressure sensing die according to an embodiment of the disclosure.

FIG. 6G is a cross-sectional view of a pressure sensor 600g according to an embodiment of the disclosure. Pressure sensor 600g includes a single pressure sensing die 601. Pressure sensor die 601 is thinned to form a first sensitive diaphragm 603 and a second sensitive diaphragm 613. A plurality of piezoresistive elements (not shown) are formed at the surface of sensitive diaphragm 603 and at the surface of sensitive diaphragm 613. Pressure applied to a surface of the sensitive diaphragms 603, 613 causes deflection of the sensitive diaphragm which exerts stress on the piezoresistive elements. The electrical resistance of the piezoresistive elements varies due to the stress created as sensitive diaphragm 603, 613 is deflected by the applied pressure. The piezoresistive elements are electrically connected to contact pads 617 via bond wires 615. Pressure sensing die 601 is bonded to a base plate 621 by adhesive bonds 619. Adhesive bonds 619 may be formed using an adhesive or by a fixed bonding technique such as solder or glass frit. Base plate 621 is connected to a housing formed from a first housing member 630 and a second housing member 640.

A cap 680 is attached to a first surface of pressure sensing die 601. Cap 680 has spaces or voids defined within cap 680 which are positioned at locations on pressure sensing die 601 where sensitive diaphragm 603 and sensitive diaphragm 613 are located. A vacuum is formed and trapped within the cavities formed in cap 680. Diaphragm 603 is exposed to pressure P2 from below and measures this pressure with reference to the vacuum under cap 680, which is in contact with the upper surface of diaphragm 603. Diaphragm 613 is exposed to a pressure, such as ambient pressure $P_{amb}$, from below via vent channel 602 formed between pressure sensing die 601 and base plate 621. Sensitive diaphragm 613 measures pressure $P_{amb}$ with reference to the vacuum formed under cap 680, which is in contact with the upper surface of diaphragm 613. Thus, the embodiment shown in FIG. 6G measures an absolute pressure value for pressure P2 via sensitive diaphragm 603 and an absolute pressure value for ambient pressure $P_{amb}$ via sensitive diaphragm 613. By subtracting the pressure values measured by sensitive diaphragm 613 from the pressure value measured by sensitive diaphragm 603, a differential pressure between pressure P2 and ambient pressure $P_{amb}$ may be determined. The determined differential pressure may be provided as output of pressure sensor 600g.

First housing member 630 defines a first pressure volume 650. First housing member 630 has an opening 670 which allows ambient pressure $P_{amb}$ to enter first pressure volume 650. Pressure sensing die 601 includes a vent channel 602, which defines a space between pressure sensing die 601 and base plate 621 allowing ambient pressure $P_{amb}$ to enter the space below sensitive diaphragm 613 and apply the ambient pressure to the second surface of sensitive diaphragm 613 opposite the first surface of sensitive diaphragm 613. The differential pressure between pressure P2 and ambient pressure $P_{amb}$ may be determined by processing the outputs based on the resistance of piezoresistive elements on diaphragms 603, 613. For example, the output of sensitive diaphragms 603, 613, based on the variable resistance of diaphragms 603, 613 may be processed using circuitry such as the circuitry shown and referenced in FIG. 7, which is discussed in detail below.

Second housing member 640 defines a second chamber 641. A threaded port 663 is defined in a wall of second housing member 640 to allow a second fluid at a second pressure, P2, to enter pressure sensor 600g. The second fluid enters port 663 and fills second pressure volume 641. The second fluid is at a second pressure which exerts a force on the second side of sensitive diaphragm 603 by entering hole 625 defined through base plate 621. Sensitive diaphragm 603 is in contact on its upper surface by a vacuum formed under cap 680 and receives pressure P2 to the second surface of sensitive diaphragm 603, opposite the first surface. Accordingly, the output of sensitive diaphragm 603 represents an absolute pressure value representative of pressure P2 relative to a vacuum in addition to any non-pressure related signals. The piezoresistive elements defined at or arranged on the surface of sensitive diaphragm 603 may be electrically connected to the piezoresistive elements defined at the surface of sensitive diaphragm 613 in a manner such that the output signal generated by sensitive diaphragm 613 is subtracted from the output generated by sensitive diaphragm 601. Since both sensitive diaphragm 603 and sensitive diaphragm 613 generate outputs each containing non-pressure related inputs, subtracting the measured signals of sensitive diaphragm 603 from the output signal of sensitive diaphragm 613 results in an output signal of the sensor 600g containing the signal generated by the differential pressure input as the non-pressure related inputs to both sensitive diaphragms 603, 613 are subtracted out of the final output of pressure sensor 600g.

Non-pressure related signals may include stress forces which are created when a fluid conduit fitting is threaded onto threaded port 663. The tightness at which the fitting is attached may create stresses that are transmitted through the housing members 630, 640 to base plate 621. Base plate 621 is directly attached to semiconductor pressure sensing die 601 and may create stresses to sensitive diaphragms 603, 613. Other properties, such as the thermal expansion coefficients of pressure sensing die 601, base plate 621 and housing members 630, 640 may differ, causing adjoining components to expand or contract at different rates with response to temperature. A change in temperature, combined with varying rates of expansion or contraction, may create additional stress that may be transferred to sensitive diaphragms 603, 613 causing a change in the resistance of piezoresistive elements on the surface of sensitive diaphragm 603, 613.

Figure 6H:
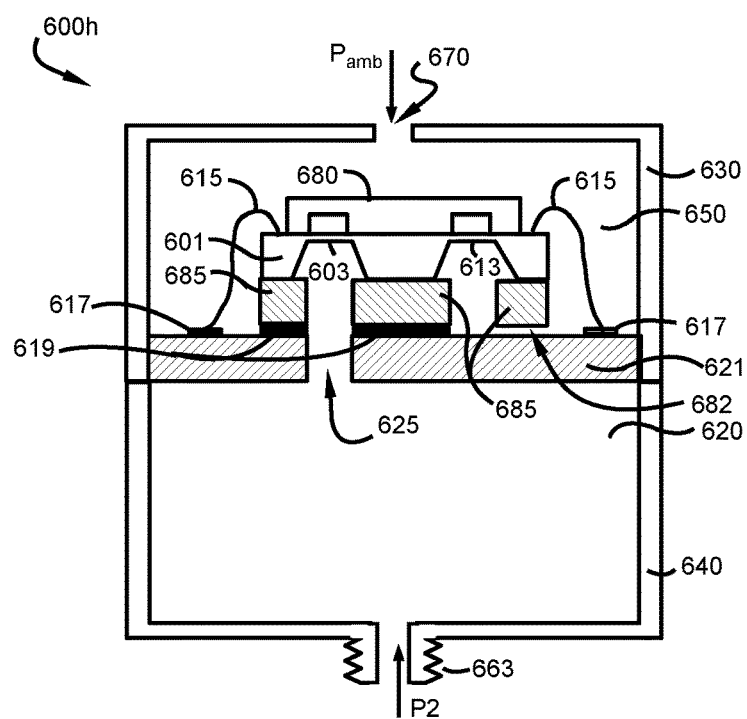
FIG. 6H is a cross-sectional view of a pressure sensor utilizing multiple pressure sensitive diaphragms on a single pressure sensing die according to an embodiment of the disclosure.

FIG. 6H is a cross-sectional view of a pressure sensor 600h according to an embodiment of the disclosure. Pressure sensor 600h includes a single pressure sensing die 601. Pressure sensor die 601 is thinned in multiple locations to form a first sensitive diaphragm 603 and a second sensitive diaphragm 613. A plurality of piezoresistive elements (not shown) are formed at or arranged on the surface of sensitive diaphragm 603 and at the surface of sensitive diaphragm 613. A cap 680 is attached to a first surface of pressure sensing die 601. Cap 680 has spaces defined within cap 680 which are positioned at locations on the pressure sensing die 601 where sensitive diaphragm 603 and sensitive diaphragm 613 are located. Pressure sensing die 601 is further attached to a constraint 685 at the surface of pressure sensing die 601 opposite sensitive diaphragms 603 and 613. Constraint 685 may comprises a material possessing a thermal expansion coefficient that is closer to the thermal expansion coefficient of the semiconductor material of pressure sensing die 601 than thermal expansion coefficient of base plate 621. Under conditions where temperature variations cause expansion or contraction of the materials of pressure sensing die 601, constraint 685 and/or base plate 621, reducing the difference between the thermal expansion coefficients between adjoining materials will reduce stress on pressure sensing die 601 due to thermal effects and non-pressure related stimuli. In addition, constraint 685 increases the strength of the pressure sensing die structure, which further isolates the dies and pressure sensitive diaphragms from adverse effects of stress.

Figure 6I:
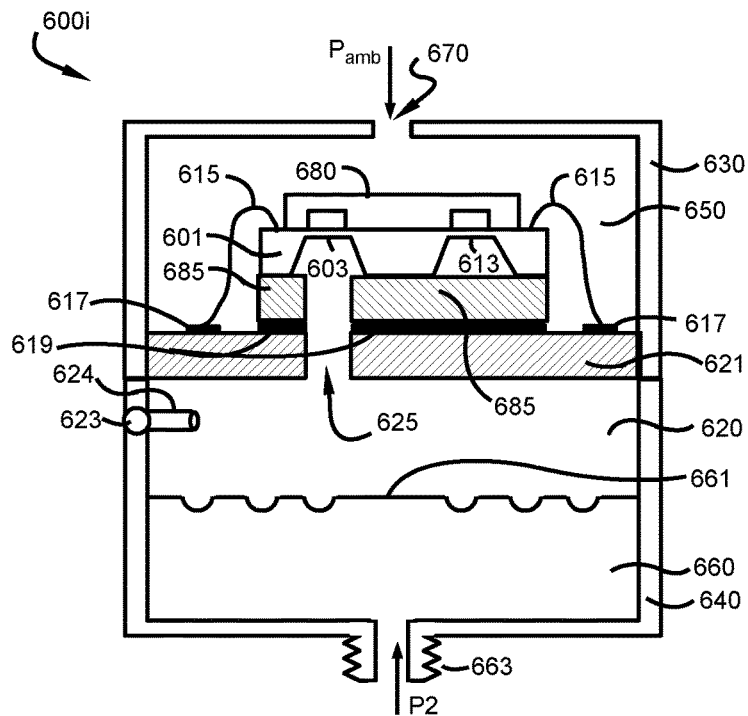
FIG. 6I is a cross-sectional view of a pressure sensor utilizing multiple pressure sensitive diaphragms on a single pressure sensing die according to an embodiment of the disclosure.

Referring now to FIG. 6I, a cross-sectional view of a pressure sensor 600i according to an embodiment of the disclosure is shown. Pressure sensor 600i includes a single pressure sensing die 601. Pressure sensor die 601 is thinned to form a first sensitive diaphragm 603 and a second sensitive diaphragm 613. A plurality of piezoresistive elements (not shown) are formed at the surface of sensitive diaphragm 603 and at the surface of sensitive diaphragm 613. Pressure applied to a surface of sensitive diaphragms 603, 613 causes deflection of the sensitive diaphragm which exerts stress on the piezoresistive elements. The electrical resistance of the piezoresistive elements varies due to the stress created as the sensitive diaphragm 603, 613 is deflected by the applied pressure. The piezoresistive elements are electrically connected to contact pads 617 via bond wires 615. The pressure sensing die 601 is bonded to a constraint 686 at the surface of pressure sensing die 601 opposite sensitive diaphragms 603 and 613. Constraint 686 includes an aperture aligned with sensitive diaphragm 603, which allows pressure P2 to access the underside of sensitive diaphragm 603. Constraint 686 is solid and seals the recess under sensitive diaphragm 613 between pressure sensing die 601 and base plate 621. The recess beneath sensitive diaphragm 613 may be evacuated to form a vacuum at the lower side of sensitive diaphragm 613.

Constraint 686 may comprises a material possessing a thermal expansion coefficient that is closer to the thermal expansion coefficient of the semiconductor material of pressure sensing die 601 than thermal expansion coefficient of base plate 621. Under conditions where temperature variations cause expansion or contraction of the materials of pressure sensing die 601, constraint 686 and/or base plate 621, reducing the difference between the thermal expansion coefficients between adjoining materials will reduce stress on pressure sensing die 601 due to thermal effects and non-pressure related stimuli. In addition, constraint 686 increases the strength of the pressure sensing die structure, which further isolates the dies and pressure sensitive diaphragms from adverse effects of stress. Constraint 686 is attached to base plate 621 by adhesive bonds 619. Adhesive bonds 619 may be formed using an adhesive or by a fixed bonding technique such as solder or glass frit. Base plate 621 is connected to a housing formed from a first housing member 630 and a second housing member 640.

A cap 680 is attached to a first surface of pressure sensing die 601. Cap 680 has spaces or voids defined within cap 680 which are positioned at locations on pressure sensing die 601 where sensitive diaphragm 603 and sensitive diaphragm 613 are located. A vacuum is formed and trapped within the cavities formed in cap 680. Diaphragm 603 is exposed to pressure P2 from below and measures this pressure with reference to the vacuum under cap 680, which is in contact with the upper surface of diaphragm 603. Diaphragm 613 is exposed to a vacuum from above and below and measures absolute vacuum pressure. Thus, the embodiment shown in FIG. 6i measures an absolute pressure value for pressure P2 via diaphragm 603 and an absolute vacuum pressure via diaphragm 613. By subtracting the pressure values measured by diaphragm 613 from the pressure value measured by diaphragm 603, a corrected absolute pressure value of pressure P2 may be determined. The determined absolute pressure P2 value may be provided as output of pressure sensor 600i.

First housing member 630 defines a first pressure volume 650. First housing member 630 has an opening 670 which allows ambient pressure $P_{amb}$ to enter first pressure volume 650. The absolute pressure P2 may be determined by processing the outputs based on the resistance of piezoresistive elements on diaphragms 603, 613. For example, the output of sensitive diaphragms 603, 613, based on the variable resistance of diaphragms 603, 613 may be processed using circuitry such as the circuitry shown and referenced in FIG. 7, which is discussed in detail below. Sensitive diaphragm 603 measures the absolute pressure value of pressure P2, which includes non-pressure related stresses on sensitive diaphragm 603. Meanwhile, sensitive diaphragm 613 measures absolute vacuum pressure which also includes non-pressure related stresses applied to sensitive diaphragm 613. Therefore, subtracting the output signal of sensitive diaphragm 613, which represents only the non-pressure related stresses from the output signal of sensitive diaphragm 603, which includes the absolute pressure P2 value and the non-pressure related stresses, provides a corrected output signal of pressure sensor 600i which includes corrected values representative of the absolute pressure value of pressure P2.

Second housing member 640 defines a second chamber. The second chamber is divided by a flexible diaphragm 661 for defining a second pressure volume 660 and a fluid-fillable volume 620. Fluid-fillable volume 620 may be filled with a fluid which is not harmful to pressure sensing die 601 or the piezoresistive elements or electrical connections associated with the sensitive diaphragms 603, 613 via fill port 624. By way of example, if pressure sensing die 601 comprises a semiconductor material, fluid-fillable volume 620 may be filled with an oil, such as silicone oil. Once filled, fluid-fillable volume 620 may be sealed, using a welding ball 623, or other technique for sealing fill port 624 (e.g. crimping). A threaded port 663 is defined in a wall of second housing member 640 to allow a second fluid at a second pressure, P2, to enter pressure sensor 600e. The second fluid enters port 663 and fills second pressure volume 660. The second fluid is at a second pressure which exerts a force on flexible diaphragm 661. Flexible diaphragm 661 deflects due to the exerted force and transmits the force through the fluid in fluid-fillable volume 620 to a lower surface of sensitive diaphragm 603 by entering hole 625 defined through base plate 621. Sensitive diaphragm 603 is in contact on its upper surface by a vacuum formed under cap 680 and receives pressure P2 to the second surface of the sensitive diaphragm 603, opposite the first surface. Accordingly, the output of sensitive diaphragm 603 represents an absolute pressure value representative of pressure P2 relative to a vacuum in addition to any non-pressure related signals. The piezoresistive elements defined at or arranged on the surface of sensitive diaphragm 603 may be electrically connected to the piezoresistive elements defined at the surface of sensitive diaphragm 613 in a manner such that the output signal generated by sensitive diaphragm 613 is subtracted from the output generated by sensitive diaphragm 601. As both sensitive diaphragm 603 and sensitive diaphragm 613 generate outputs each containing non-pressure related inputs, subtracting the measured signals of sensitive diaphragm 603 from the output signal of sensitive diaphragm 613 results in an output signal of pressure sensor 600i containing the signal generated by the differential pressure input as the non-pressure related inputs to both sensitive diaphragms 603, 613 are subtracted out of the final output of pressure sensor 600i.

Non-pressure related signals may include stress forces which are created when a fluid conduit fitting is threaded onto threaded port 663. The tightness at which the fitting is attached may create stresses that are transmitted through housing members 630, 640 to base plate 621. Base plate 621 is directly attached to semiconductor pressure sensing die 601 and may create stresses to the sensitive diaphragms 603, 613. Other properties, such as the thermal expansion coefficients of pressure sensing die 601, base plate 621 and housing members 630, 640 may differ, causing adjoining components to expand or contract at different rates with response to temperature. A change in temperature, combined with varying rates of expansion or contraction, may create additional stress that may be transferred to sensitive diaphragms 603, 613 causing a change in the resistance of piezoresistive elements on the surface of sensitive diaphragm 603, 613.

Figure 6J:
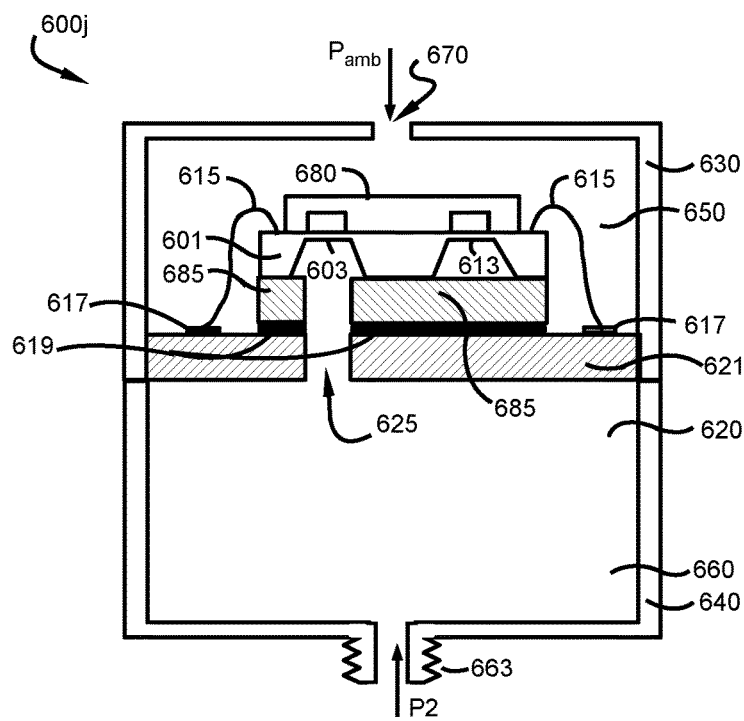
FIG. 6J is a cross-sectional view of a pressure sensor utilizing multiple pressure sensitive diaphragms on a single pressure sensing die according to an embodiment of the disclosure.

FIG. 6J is a cross-sectional view of an absolute pressure sensor 600j, which is similar to pressure sensor 600i of FIG. 6I, with the exception that the flexible diaphragm and fluid-fillable volumes have been omitted. Accordingly, a fluid at pressure P2 is introduced to port 663 in second housing member 640. The fluid enters opening 625 and passes through the openings in base plate 621 and constraint 686 and comes into fluid contact with the lower side of sensitive diaphragm 603 defined in pressure sensing die 601.

Pressure sensor 600*j* acts as an absolute pressure sensor providing a corrected output representative the absolute pressure value of pressure P2. Pressure sensing die 601 includes cap 680 which covers sensitive diaphragms 603, 613 and includes vacuum-filled spaces aligned with the locations of the sensitive diaphragms 603, 613. Constraint 686 is attached to pressure sensing die 601 and has an opening defined under sensitive diaphragm 603. Constraint 686 is solid and seals the cavity under sensitive diaphragm 613. The cavity is evacuated to produce a vacuum on the lower side of sensitive diaphragm 613.

Within pressure sensor 600*j*, sensitive diaphragm 603 measures an absolute pressure value of pressure P2 with reference to vacuum. Pressure P2 is applied to the lower side of sensitive diaphragm 603 while a vacuum is applied to the upper side of sensitive diaphragm 603 under cap 680. Similarly, sensitive diaphragm 613 measures an absolute vacuum having a vacuum applied to its top surface under cap 680 and another vacuum space defined under sensitive diaphragm 613 sealed by constraint 686. As a result, sensitive diaphragm 613 produces an output that is representative of non-pressure related stresses, while sensitive diaphragm 603 measures an absolute pressure of pressure P2 as well as the non-pressure related stresses applied to pressure sensing die 601. The output of sensitive diaphragm 613 may be subtracted from the output of sensitive diaphragm 603 to produce an absolute pressure value for P2 which is corrected for non-pressure related stresses. For example, the outputs of sensitive diaphragms 603, 613 may be applied and processed using a circuit such as the circuit shown in FIG. 7, which will now be described in detail.

Figure 7:
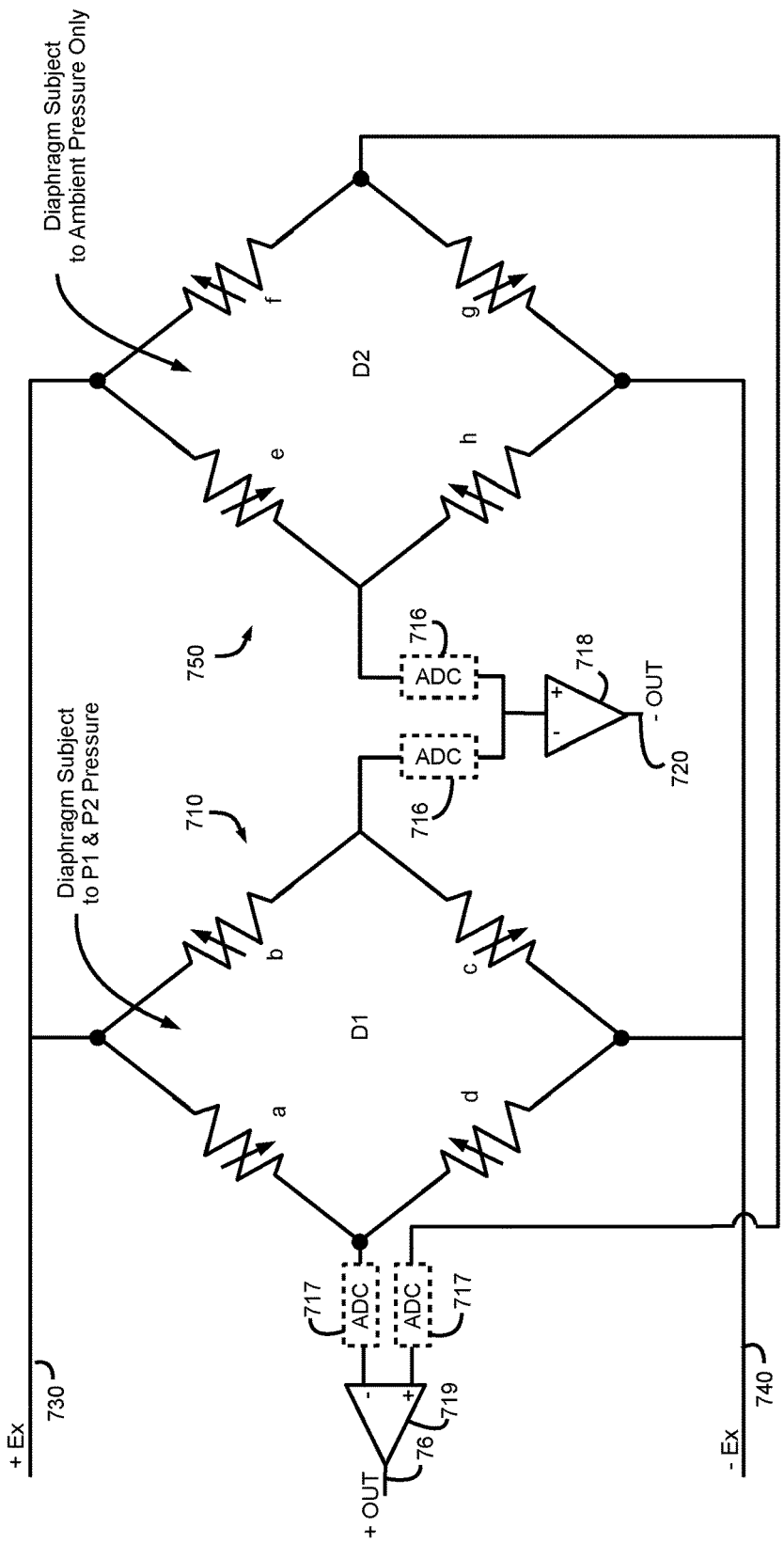
FIG. 7 is a circuit diagram of parallel connected bridge circuits on the diaphragms of the embodiments of FIGS. 5 and 6A through 6J.

FIG. 7 depicts a schematic 700 of two parallel connected bridge circuits 710 (D1) and 750 (D2) which may be defined in or on diaphragms 303 and 313 (shown in FIG. 3). Bridge circuit 710 corresponds to a circuit defined in or on diaphragm 303 of pressure sensing die 301, and includes piezoresistive elements in a bridge pattern, which elements comprise variable resistors a, b, c, d whose resistances vary with the flexing of diaphragm 303. Bridge circuit 750 corresponds to a circuit defined in or on diaphragm 313 of die assembly 311, and includes piezoresistive elements in a bridge pattern, which elements comprise variable resistors e, f, g, h whose resistances vary with the flexing of diaphragm 313. As shown in FIG. 7, bridge circuits 710 and 750 may each have an excitation voltage 730 (Ex+) and 740 (Ex−) applied to them, which may be effected by a suitable electrical connection such as suitable electrical conductors connected to the bridge circuits. In the embodiment shown in FIG. 7, bridge circuits 710 and 750 are electrically connected at output 720, which may also be effected by a suitable electrical connection such as an electrical conductor between the bridge circuits.

In particular, the electrical connector defined by output 720 is configured to connect the common mode error output of bridge circuit 750 to the output of the differential pressure sensed by bridge circuit 710 so that the output 76 (Out+) and output 720 (Out−) is the common mode error corrected differential pressure measured by the combination of bridge circuits 710, 750. The piezoresistive elements and conductive traces may be formed by differentially diffusing one or more dopants within the semiconductor material of the die to define the piezoresistive elements and conductive circuit elements, using techniques and materials well known in the art. The conductive circuit elements may be representative of a conductive path in the semiconductor material to complete circuits including the piezoresistive elements, and may also include contact pads for connecting external conductors to the circuit. In an embodiment, the negative output terminal of a pressure sensitive electrical element of the first diaphragm may be connected to the positive output terminal of a pressure sensitive electrical element of the second diaphragm by a bonding wire or a conductive trace on or in the pressure sensing die.

The outputs of bridge circuits 710, 750 may be summed using summing amplifiers 718, 719. Summing amplifiers 718, 719 may be analog summing amplifiers or, in an embodiment, may be implemented as digital summing amplifiers. When optionally implemented as digital summing amplifiers, the outputs of bridge circuits 710, 750 are input to analog-to-digital converters (ADCs) 716, 717. The outputs are digitized by ADCs 716, 717 and summed by digital summing amplifiers 718, 719. In certain embodiments ADCs 716, 717 may be omitted and analog summing amplifiers 718, 719 may be used. Accordingly, common mode correction may be performed in analog or digitally. A digital architecture requires additional components, which increases complexity.

Figure 7A:
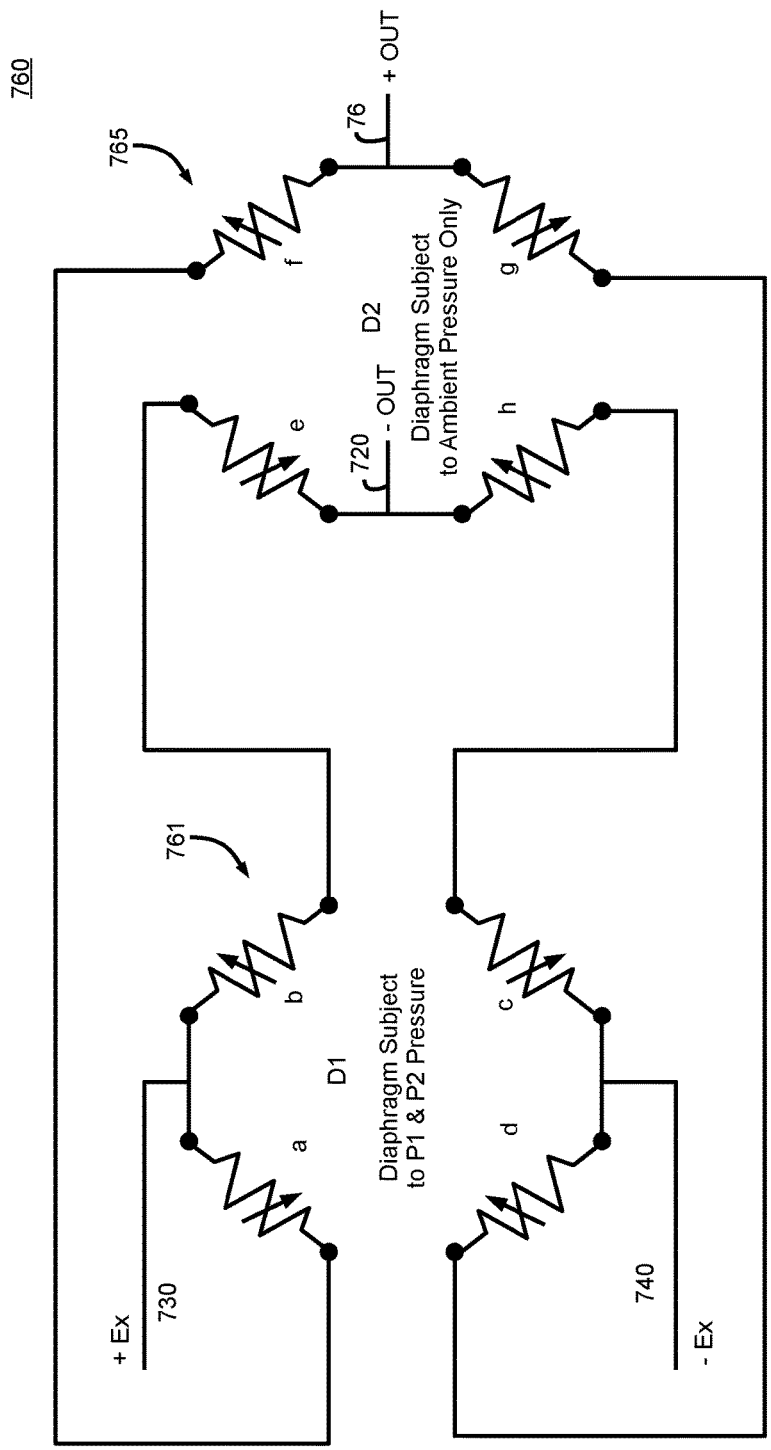
FIG. 7A is a circuit diagram of series connected bridge circuits on the diaphragms of the embodiments of FIGS. 5 and 6A through 6J.
Figure 7B:
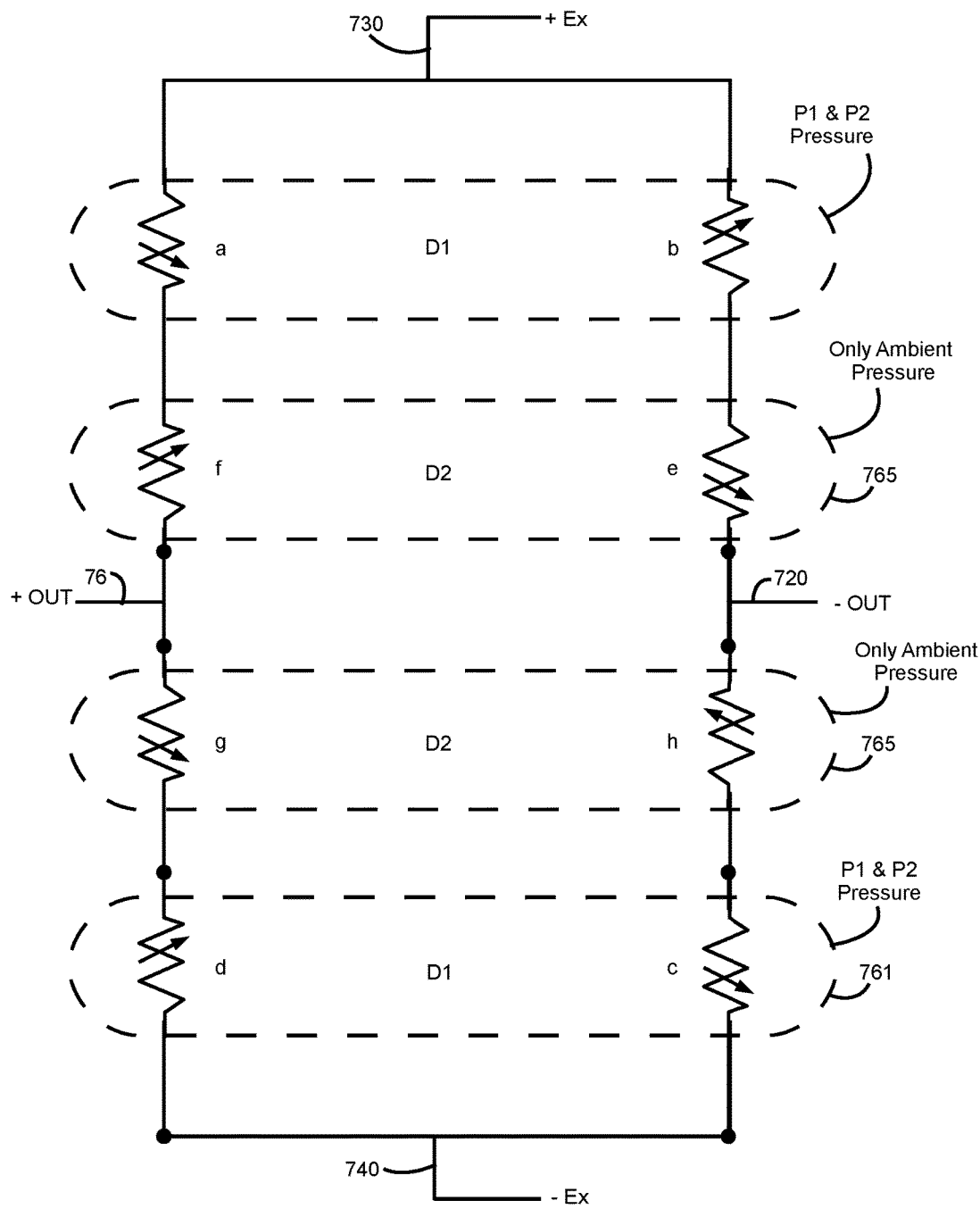
FIG. 7B is a functional schematic of the series connected bridge circuits of FIG. 7A.

FIG. 7A depicts a schematic 760 of an arrangement in which, similar to FIG. 7, four variable resistors a, b, c, d are provided on each of a first diaphragm 761 arranged to receive differential pressure and a second diaphragm 765 arranged to receive pressure from a same source (e.g. ambient) on both sides. In this arrangement, on each diaphragm, two pairs of resistors are connected to one another, and each pair is connected in series to the two pairs of resistors defined on the other of the two diaphragms. Otherwise stated, strain sensitive resistors are arranged in a full open bridge arrangement on each diaphragm. Reference voltages are provided at nodes within pairs of resistors on the first diaphragm, and outputs are provided at nodes within pairs of resistors on the second diaphragm. More specifically, variable resistors a and b are connected to define a first pair of resistors on diaphragm 761. Variable resistors c and d are connected to define a second pair of resistors on diaphragm 761. Variable resistors e and h are connected to define a first pair of resistors on diaphragm 765. Variable resistors f and g are connected to define a second pair of resistors on diaphragm 765. Resistor pair a/b on diaphragm 761 is connected in series to resistor pair e/h and to resistor pair f/g on diaphragm 765. Similarly, resistor pair c/d on diaphragm 761 is connected in series to resistor pair e/h on diaphragm 765 and to resistor pair f/g on diaphragm 765. Diaphragm 761 is arranged to detect differential pressure, similarly to diaphragm 303 of die 301. Diaphragm 765 may be arranged as diaphragm 313 of die assembly 311, to detect common mode pressure. Positive excitation voltage 730 (Ex+) is applied at a node between resistors a and b on diaphragm 761. Negative excitation voltage 740 (Ex−) is applied at a node between resistors c and d on diaphragm 761. These voltages may be effected by a suitable electrical connection such as suitable electrical conductors connected to the bridge circuits. Positive output 76 (+OUT) is provided at a node between resistor f and resistor g on diaphragm 765. Negative output 720 (−OUT) is provided at a node between piezoresistor e and piezoresistor h on diaphragm 765. Connections for outputs may be effected by a suitable electrical connection such as an electrical conductor between the piezoresistors. When the excitation voltages are applied between resistor pairs on diaphragm 761, the output signals are effectively corrected for common mode errors. As compared to the arrangement of FIG. 7, the impedance is greater, as a result of the series connected resistors. As a result, overall power consumption decreases. FIG. 7B shows a high level functional schematic of the series bridge circuits of FIG. 7A. For ease of illustration, each diaphragm 761, 765 is shown twice.

Figure 7C:
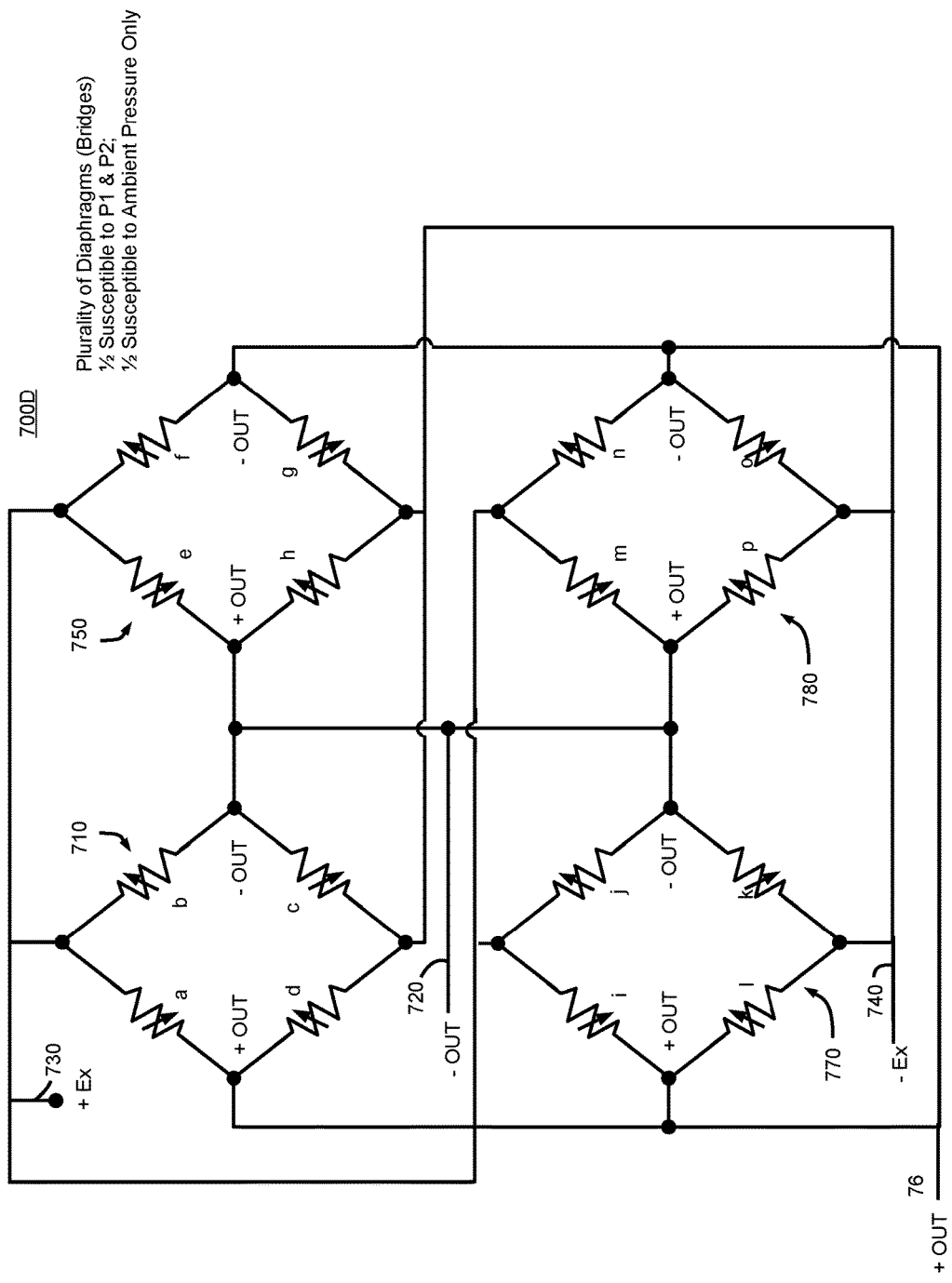
FIG. 7C is a circuit diagram of a plurality of bridge circuits on a plurality of diaphragms according to an embodiment of the disclosure.

Referring now to FIG. 7C, an embodiment of a differential pressure sensor 700D according to the disclosure utilizes a plurality of diaphragms susceptible to differential pressure, and the same number of diaphragms susceptible to common ambient pressure. In the embodiment of FIG. 7C, two of each type of diaphragm are shown; however, more diaphragms may be provided without departing from the scope of the present disclosure. While the embodiment illustrated in FIG. 7C shows four bridge circuits 710, 750, 770 and 780, corresponding to four diaphragms, or two pairs of diaphragms, additional diaphragms may be added in pairs having corresponding bridge circuits. Common mode errors may be corrected by configuring the sensor 700D such that half of the diaphragms are subjected to differential pressure between pressure P1 and P2, and the remaining diaphragms are subjected only to ambient pressure $P_{amb}$. Each bridge circuit is arranged in a closed full bridge arrangement, with each of four resistors connected in series. A positive excitation voltage 730 (+Ex) is applied to each bridge circuit. Voltage 730 is applied to bridge 710 at a node between piezoresistor a and piezoresistor b, to bridge circuit 750 at a node between piezoresistor e and piezoresistor f, to bridge circuit 770 at a node between piezoresistor i and piezoresistor j, and to bridge 780 at a node between piezoresistor m and piezoresistor n. A negative excitation voltage 740 (−Ex) is applied to each bridge circuit at a node opposite the nodes at which positive excitation voltage 730 (+Ex) is applied. Negative excitation voltage 740 (−Ex) is applied to bridge 710 between piezoresistor c and piezoresistor d, to bridge 750 between piezoresistor g and piezoresistor h, to bridge 770 between piezoresistor k and piezoresistor l, and to bridge 780 between piezoresistor o and piezoresistor p.

The negative output 720 (−OUT) is connected at a node positioned between piezoresistor b and piezoresistor c of bridge 710, piezoresistor e and piezoresistor h of bridge 750, piezoresistor j and piezoresistor k of bridge 770 and piezoresistor m and piezoresistor p of bridge 780. The positive output 76 (+OUT) is commonly connected to each bridge circuit. Positive output 76 is positioned between piezoresistor a and piezoresistor d of bridge 710, piezoresistor f and piezoresistor g of bridge 750, piezoresistor i and piezoresistor l of bridge 770 and piezoresistor n and piezoresistor o of bridge 780.

Figure 7D:
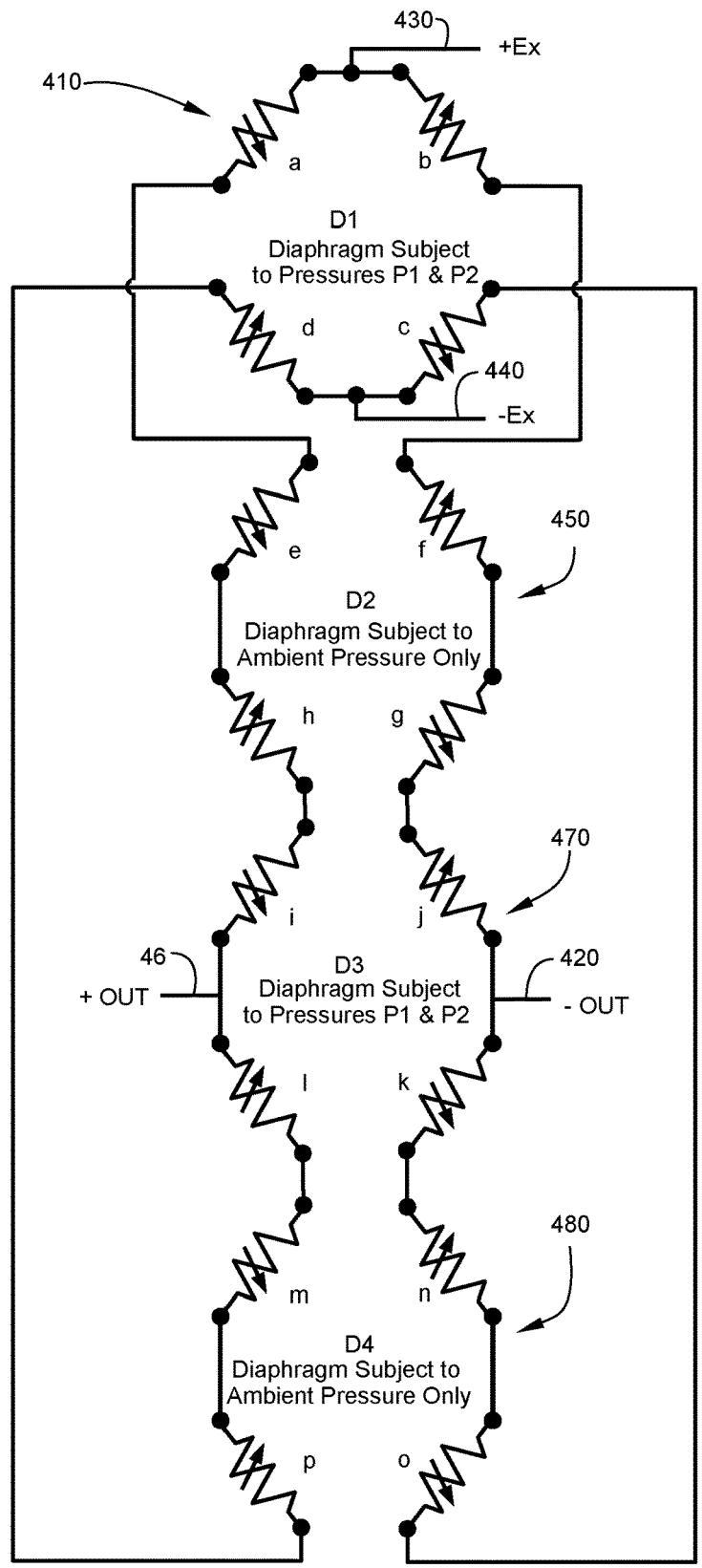
FIG. 7D is a circuit diagram of a plurality of bridge circuits connected in series on a plurality of diaphragms according to an embodiment of the disclosure.

FIG. 7D depicts a schematic of an arrangement in which, similar to FIG. 7C, sixteen (16) variable resistors are provided in groups of four on each of a plurality of diaphragms 410, 450, 470, 480 (D1, D2, D3, D4). While four diaphragms are illustrated in FIG. 7D, more or fewer diaphragms may be used. Half of the diaphragms are arranged to receive differential pressure and the other half of the plurality of diaphragms are arranged to receive pressure from a same source (e.g. ambient pressure $P_{amb}$) on both sides. In this arrangement, on each diaphragm, two pairs of resistors are connected to one another, and each pair is connected in series to the two pairs of resistors defined on the other diaphragms. Otherwise stated, strain sensitive resistors are arranged in a full open bridge arrangement on each diaphragm. Reference voltages 730, 740 are provided at nodes within pairs of resistors on the first diaphragm 410, and outputs 76, 720 are provided at nodes within pairs of resistors on diaphragm 470. More specifically, variable resistors a and b are connected to define a first pair of resistors on diaphragm 710. Variable resistors c and d are connected to define a second pair of resistors on diaphragm 410. Variable resistors e and h are connected to define a first pair of resistors on diaphragm 450. Variable resistors f and g are connected to define a second pair of resistors on diaphragm 450. Resistor pair a/b on diaphragm 410 is connected in series to resistor pair e/h and to resistor pair f/g on diaphragm D2 750. Similarly, resistor pair c/d on diaphragm 410 is connected in series to resistor pair m/p on diaphragm 480 and to resistor pair n/o on diaphragm 480 Diaphragms 410 and 470 are arranged to detect differential pressure, similarly to diaphragm 303 of die 301. Diaphragms 450 and 480, which may be arranged as one or more diaphragms 313 of die 311, to detect common mode pressure. Positive excitation voltage 430 (Ex+) is applied at a node between resistors a and b on diaphragm 410. Negative excitation voltage 440 (Ex−) is applied at a node between resistors c and d on diaphragm 410. These voltages may be effected by a suitable electrical connection such as suitable electrical conductors connected to the bridge circuits. Positive output 76 is provided at a node between resistor i and resistor l on diaphragm 470. Negative output 420 (−OUT) is provided at a node between piezoresistor j and piezoresistor k on diaphragm 470. Connections for outputs may be effected by a suitable electrical connection such as an electrical conductor between the piezoresistors. When the excitation voltages are applied between resistor pairs on diaphragm 410, the output signals are effectively corrected for common mode errors. As compared to the arrangement of FIG. 7C, the impedance is greater. As a result of the greater impedance, overall power consumption decreases.

Figure 7E:
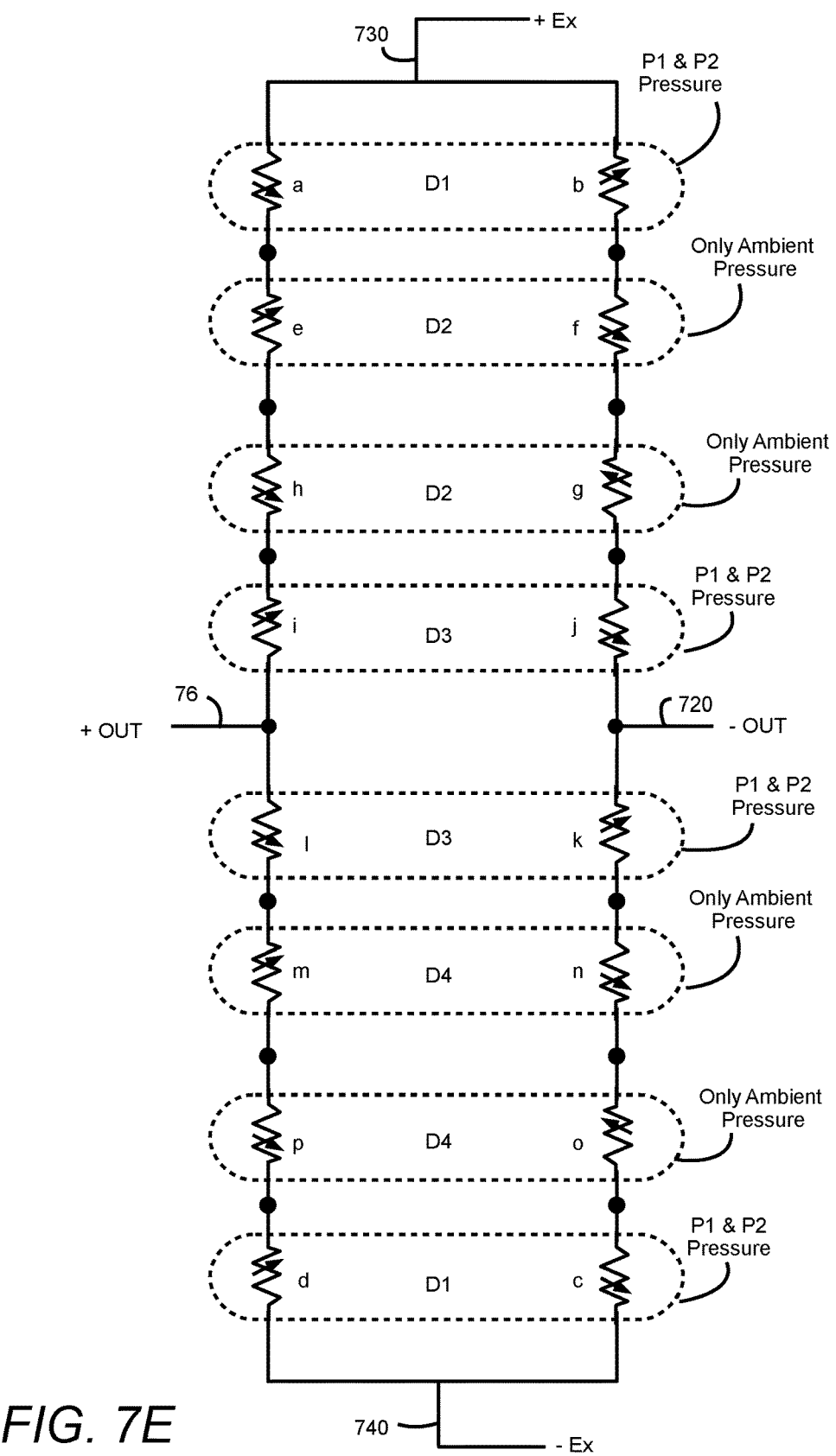
FIG. 7E is a functional schematic drawing of an embodiment having a plurality of series connected bridge circuits.

FIG. 7E is a high level functional diagram of a series connected common mode error compensated sensor circuit, such as that utilized by FIG. 7D, utilizing a plurality of full open bridge circuits arranged on four diaphragms D1, D2, D3 and D4, and connected in series similarly to the circuit shown in FIG. 7A. Excitation voltage 730 (+Ex) is applied at a node between piezoresistor a and piezoresistor b of a first bridge circuit on diaphragm D1 which is exposed to the differential pressure of pressure P1 and pressure P2. Piezoresistor a is connected in series to piezoresistors e and h of a first bridge circuit on diaphragm D2 which is only exposed to ambient pressure $P_{amb}$. Piezoresistor h is coupled to piezoresistor i of a second bridge circuit on diaphragm D3 which is exposed to pressure P1 and pressure P2. Piezoresistor i is connected to piezoresistor l on diaphragm D3, and positive output 76 (+OUT) is at a node between piezoresistors i and l. Piezoresistor l is connected to piezoresistor m which is part of a bridge defined by m and p on diaphragm D4 which is only exposed to ambient pressure $P_{amb}$. Piezoresistor p is connected to piezoresistor d on diaphragm D1 which is exposed to the differential pressure between pressure P1 and pressure P2. Negative excitation voltage 740 (−Ex) is connected at a node between resistors c and d.

Piezoresistor b is connected in series to piezoresistors f and g on diaphragm D2 of a first bridge circuit which is only exposed to pressure P1. Piezoresistor g is coupled to piezoresistor j of a second bridge circuit on diaphragm D3 which is exposed to pressure P1 and pressure P2. Piezoresistor j is connected to piezoresistor k A node between j and k is provided for output 720. Piezoresistor k is connected to piezoresistors n and o on diaphragm D4 which is only exposed to ambient pressure $P_{amb}$. Piezoresistor o is connected to piezoresistor c of the first bridge circuit on diaphragm D1 which is exposed to the differential pressure between pressure P1 and pressure P2.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A pressure sensor comprising:
   a first pressure sensing die comprising a semiconductor material and having a first sensitive diaphragm;
   a second pressure sensing die comprising a semiconductor material and having a second sensitive diaphragm; and
   a housing containing the first pressure sensing die and the second pressure sensing die, the housing containing a first fluid at a first pressure in fluid communication with a first surface of the first sensitive diaphragm of the first pressure sensing die, and a second fluid at a second pressure in fluid communication with a second surface of the first sensitive diaphragm of the first pressure sensing die, and wherein a first and second surface of the second sensitive diaphragm of the second pressure sensing die are in fluid communication with a third fluid at a third pressure.

2. The pressure sensor of claim 1, further comprising a base, wherein the first pressure sensing die is attached to a first surface of the base, the first sensitive diaphragm of the first pressure sensing die being aligned with an aperture extending through the base from the first surface of the base to the second surface of the base opposite the first surface, the second pressure sensing die attached to the first surface of the base such that a ventilation channel is defined for an inner volume of the second pressure sensing die between the second pressure sensing die and the base.

3. The pressure sensor of claim 2, wherein said housing comprises:
   an upper housing member attached to the first surface of the base, the upper housing member defining a first septum between the first pressure sensing die and the second pressure sensing die defining a first isolated volume containing the first pressure sensing die and a second isolated volume containing the second pressure sensing die, said second isolated volume configured to be at the third pressure.

4. The pressure sensor of claim 3, wherein the upper housing member comprises a first input port in fluid communication with the first isolated volume containing the first pressure sensing die and the first sensitive diaphragm of the first pressure sensing die.

5. The pressure sensor of claim 4, the housing further comprising a lower housing member attached to the second surface of the base opposite the first surface of the base, the lower housing member having a second input port in fluid communication with the second surface of the first sensitive diaphragm of the first pressure sensing die.

6. The pressure sensor of claim 5, wherein the first fluid at the first pressure when introduced to the first input port applies the first pressure to the first surface of the first sensitive diaphragm of the first pressure sensing die and the second fluid at the second pressure when introduced to the second input port applied the second pressure to the second surface of the first sensitive diaphragm of the first pressure sensing die, thereby producing a differential pressure applied to the first sensitive diaphragm of the first pressure sensing die.

7. The pressure sensor of claim 1, wherein the first sensitive diaphragm of the first pressure sensing die comprises a plurality of piezoresistors defined in the first surface of the first sensitive diaphragm of the first pressure sensing die arranged in a first bridge circuit and the second sensitive diaphragm of the second pressure sensing die comprises a second plurality of piezoresistors defined in the first surface of the second sensitive diaphragm of the second pressure sensing die arranged in a second bridge circuit, wherein the first bridge circuit and the second bridge circuit are connected such that an output signal of the second bridge circuit is subtracted from an output signal of the first bridge circuit.

8. The pressure sensor of claim 7, wherein the output signal of the second bridge circuit is representative of an error due to non-pressure related factors, and a result of subtraction of the output signal of the second bridge circuit from the output signal of the first bridge circuit is representative of a corrected output signal of the pressure sensor.

9. The pressure sensor of claim 1, further comprising
   a base,
      wherein the first pressure sensing die attached to a first surface of the base, the first sensitive diaphragm of the first pressure sensing die being aligned with an aperture extending through the base from the first surface of the base to a second surface of the base opposite the first surface, the second pressure sensing die attached to the first surface of the base, the second sensitive diaphragm of the second pressure sensing die being aligned with a second aperture extending through the base from the first surface to the second surface opposite the first surface.

10. The pressure sensor of claim 9, further comprising:
    a first upper housing member comprising a first pressure inlet in fluid communication with a first surface of the first sensitive diaphragm of the first pressure sensing die; and an opening configured to allow fluid communication between the third pressure and a first surface of the second sensitive diaphragm of the second pressure sensing die.

11. The pressure sensor of claim 10, further comprising:
a second lower housing member comprising a second pressure inlet in fluid communication with a second surface of the first sensitive diaphragm of the first pressure sensing die, a second septum for separating the first sensitive diaphragm of the first pressure sensing die from the second sensitive diaphragm of the second pressure sensing die, and an opening configured to allow fluid communication between the third pressure and a second surface of the second sensitive diaphragm of the second pressure sensing die.

12. A differential pressure sensor comprising:
a sensor housing including a base plate having an aperture defined therein, wherein a first side of the base plate is configured to be in fluid communication with a first fluid at a first pressure at the aperture and a second side of the base plate is configured to be in fluid communication with a second fluid at a second pressure at the aperture;
a pressure sensing die assembly attached to the first side of said base plate, the pressure sensing die assembly comprising:
  a pressure sensing die attached to the base plate, the pressure sensing die comprising:
    a first chamber defining a first diaphragm having a first upper side configured to be in fluid communication with said first fluid and a lower side configured to be in fluid communication with the aperture and the second fluid;
    at least one pressure sensitive electrical element formed in or on the first diaphragm, the at least one pressure sensitive electrical element exhibiting varying resistance responsive to deflection of the first diaphragm representative of a differential pressure between the first pressure and the second pressure;
    a second chamber defining a second diaphragm including a second upper side configured to be in fluid communication with an ambient pressure and a second lower side configured to be in fluid communication with the ambient pressure;
    at least one pressure sensitive electrical element formed in or on the second diaphragm, the at least one pressure sensitive electrical element exhibiting varying resistance responsive to deflection of said second diaphragm representative of a common mode error corresponding to the pressure sensing die assembly; and
  one or more electrical conductors electrically connected to one or both of the at least one pressure sensitive electrical element bonded to the first diaphragm and the at least one pressure sensitive electrical element bonded to the second diaphragm, the one or more electrical conductors configured to output a common mode error corrected differential pressure output.

13. The differential pressure sensor of claim 12, wherein the pressure sensing die includes a vent channel which is configured to permit fluid communication between the second chamber and the ambient pressure.

14. The differential pressure sensor of claim 12, wherein the base plate is attached to the pressure sensing die such that the first chamber is in fluid communication with the second fluid but not the first fluid, and such that a vent channel is formed in the die attach material which places the second chamber in fluid communication with the ambient pressure but not the second fluid.

15. The differential pressure sensor of claim 12, wherein the base plate is made from one of silicon and glass.

16. The differential pressure sensor of claim 12, wherein a negative output terminal of said at least one pressure sensitive electrical element of the first diaphragm is connected to a positive output terminal of said at least one pressure sensitive electrical element of the second diaphragm, thereby providing at a positive output terminal of said at least one pressure sensitive electrical element of the first diaphragm an electrical output representative of a common mode corrected differential pressure, wherein one of the one or more electrical conductors is connected to the positive output terminal of the at least one pressure sensitive electrical element of the first diaphragm.

17. The differential pressure sensor of claim 12, wherein a negative output terminal of said at least one pressure sensitive electrical element of the first diaphragm is connected to the positive output terminal of said at least one pressure sensitive electrical element of the second diaphragm by one of a bonding wire and a conductive trace on or in the pressure sensing die.

18. The differential pressure sensor of claim 12, wherein each of said at least one pressure sensitive electrical element of the first diaphragm and said at least one pressure sensitive electrical element of the second diaphragm comprises a bridge circuit.

19. The differential pressure sensor of claim 12, further comprising a first flexible diaphragm separating the first fluid from the first upper side and a second flexible diaphragm separating the second fluid from the first lower side.

20. The differential pressure sensor of claim 19, further comprising an oil-filled volume between the first flexible diaphragm and the first upper side and a second oil-filled volume between the second flexible diaphragm and the first lower side.

* * * * *